(12) United States Patent
Kommula

(10) Patent No.: US 10,193,852 B2
(45) Date of Patent: *Jan. 29, 2019

(54) CANONICAL NAME (CNAME) HANDLING FOR GLOBAL SERVER LOAD BALANCING

(75) Inventor: Sunanda Lakshmi Kommula, San Jose, CA (US)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 7 days.

This patent is subject to a terminal disclaimer.

(21) Appl. No.: 12/506,137

(22) Filed: Jul. 20, 2009

(65) Prior Publication Data

US 2010/0011120 A1 Jan. 14, 2010

Related U.S. Application Data

(63) Continuation of application No. 10/214,921, filed on Aug. 7, 2002, now Pat. No. 7,574,508.

(51) Int. Cl.
*H04L 29/08* (2006.01)
*H04L 29/12* (2006.01)

(52) U.S. Cl.
CPC .... *H04L 61/1511* (2013.01); *H04L 29/12066* (2013.01); *H04L 67/101* (2013.01);
(Continued)

(58) Field of Classification Search
CPC . H04L 47/125; H04L 67/1002; H04L 61/1511
(Continued)

(56) References Cited

U.S. PATENT DOCUMENTS 5,031,094 A 7/1991 Toegel et al. ............... 364/200
5,359,593 A 10/1994 Derby et al. ................ 370/17
(Continued)

FOREIGN PATENT DOCUMENTS

| EP | 1128613 | 8/2001 |
|---|---|---|
| WO | 01/039003 | 5/2001 |
| WO | 01/093530 | 12/2001 |

OTHER PUBLICATIONS

Hsu et al., U.S. Appl. No. 12/272,618, filed Nov. 17, 2008.
(Continued)

*Primary Examiner* — Tonia L Dollinger
*Assistant Examiner* — Albert Chiou
(74) *Attorney, Agent, or Firm* — Xsensus, LLP

(57) ABSTRACT

Canonical name (CNAME) handling is performed in a system configured for global server load balancing (GSLB), which orders IP addresses into a list based on a set of performance metrics. When the GSLB switch receives a reply from an authoritative DNS server, the GSLB switch scans the reply for CNAME records. If a CNAME record is detected and it points to a host name configured for GSLB, then a GSLB algorithm is applied to the reply. This involves identifying the host name (pointed to by the CNAME record) in the reply and applying the metrics to the list of returned IP addresses corresponding to that host name, to reorder the list to place the "best" IP address at the top. If the CNAME record in the reply points to a host name that is not configured for GSLB, then the GSLB sends the reply unaltered to the inquiring client.

18 Claims, 3 Drawing Sheets

(52) U.S. Cl.
CPC ...... *H04L 67/1002* (2013.01); *H04L 67/1008* (2013.01); *H04L 67/1012* (2013.01); *H04L 67/1021* (2013.01)

(58) Field of Classification Search
USPC .................................. 709/239–241; 718/105
See application file for complete search history.

(56) References Cited

U.S. PATENT DOCUMENTS

| | | | |
|---|---|---|---|
| 5,530,872 A | 6/1996 | Smeltzer et al. | |
| 5,867,706 A | 2/1999 | Martin et al. | |
| 5,918,017 A | 6/1999 | Attanasio et al. | |
| 5,948,061 A | 9/1999 | Merriman et al. | 709/219 |
| 5,951,634 A | 9/1999 | Sitbon et al. | 709/105 |
| 6,006,269 A | 12/1999 | Phaal | |
| 6,006,333 A | 12/1999 | Nielsen | |
| 6,012,088 A | 1/2000 | Li et al. | |
| 6,078,956 A | 6/2000 | Bryant et al. | |
| 6,092,178 A | 7/2000 | Jindal et al. | 712/27 |
| 6,112,239 A | 8/2000 | Kenner et al. | 709/224 |
| 6,115,752 A | 9/2000 | Chauhan | 709/241 |
| 6,119,143 A | 9/2000 | Dias et al. | |
| 6,128,279 A | 10/2000 | O'Neil et al. | 370/229 |
| 6,128,642 A | 10/2000 | Doraswamy et al. | 709/201 |
| 6,134,588 A | 10/2000 | Guenthner et al. | |
| 6,148,410 A | 11/2000 | Baskey et al. | |
| 6,157,649 A | 12/2000 | Peirce et al. | |
| 6,167,445 A | 12/2000 | Gai et al. | |
| 6,167,446 A | 12/2000 | Lister et al. | 709/223 |
| 6,178,160 B1 | 1/2001 | Bolton | |
| 6,182,139 B1 | 1/2001 | Brendel | 709/226 |
| 6,185,619 B1 | 2/2001 | Joffe et al. | |
| 6,195,691 B1 | 2/2001 | Brown | |
| 6,205,477 B1 | 3/2001 | Johnson et al. | |
| 6,233,604 B1 | 5/2001 | Van Horne et al. | 709/203 |
| 6,249,801 B1 | 6/2001 | Zisapel et al. | |
| 6,256,671 B1 | 7/2001 | Strentzsch et al. | |
| 6,260,070 B1 | 7/2001 | Shah | |
| 6,262,976 B1 | 7/2001 | McNamara | |
| 6,286,039 B1 | 9/2001 | Van Horne et al. | 709/221 |
| 6,286,047 B1 | 9/2001 | Ramanathan et al. | 709/224 |
| 6,304,913 B1 | 10/2001 | Rune | |
| 6,317,775 B1 | 11/2001 | Coile et al. | |
| 6,324,177 B1 | 11/2001 | Howes et al. | |
| 6,324,580 B1 | 11/2001 | Jindal et al. | 709/228 |
| 6,327,622 B1 | 12/2001 | Jindal et al. | |
| 6,330,605 B1 | 12/2001 | Christensen et al. | |
| 6,336,137 B1 | 1/2002 | Lee et al. | |
| 6,378,068 B1 | 4/2002 | Foster et al. | |
| 6,381,627 B1 | 4/2002 | Kwan et al. | 709/201 |
| 6,389,462 B1 | 5/2002 | Cohen et al. | 709/218 |
| 6,393,473 B1 | 5/2002 | Chu | |
| 6,405,252 B1 | 6/2002 | Gupta et al. | |
| 6,411,998 B1 | 6/2002 | Bryant et al. | |
| 6,427,170 B1 | 7/2002 | Sitaraman et al. | 709/226 |
| 6,434,118 B1 | 8/2002 | Kirschenbaum | |
| 6,438,652 B1 | 8/2002 | Jordan et al. | 711/120 |
| 6,446,121 B1 | 9/2002 | Shah et al. | |
| 6,449,657 B2 | 9/2002 | Stanbach, Jr. et al. | 709/245 |
| 6,470,389 B1 | 10/2002 | Chung et al. | 709/227 |
| 6,473,802 B2 | 10/2002 | Masters | |
| 6,480,508 B1 | 11/2002 | Mwikalo et al. | 370/475 |
| 6,487,555 B1 | 11/2002 | Bharat | |
| 6,490,624 B1 | 12/2002 | Sampson et al. | |
| 6,513,061 B1 | 1/2003 | Ebata et al. | |
| 6,542,964 B1 | 4/2003 | Scharber | |
| 6,549,944 B1 | 4/2003 | Weinberg et al. | 709/224 |
| 6,578,066 B1* | 6/2003 | Logan | H04L 29/12009 370/312 |
| 6,578,077 B1 | 6/2003 | Rakoshitz et al. | |
| 6,601,084 B1 | 7/2003 | Bhaskaran et al. | |
| 6,606,643 B1 | 8/2003 | Emens et al. | 709/203 |
| 6,611,861 B1 | 8/2003 | Schairer et al. | |
| 6,647,009 B1 | 11/2003 | Kubota et al. | |
| 6,665,702 B1 | 12/2003 | Zisapel et al. | |
| 6,681,232 B1 | 1/2004 | Sistanizadeh et al. | 707/104.1 |
| 6,681,323 B1 | 1/2004 | Fontanesi et al. | 713/1 |
| 6,684,250 B2 | 1/2004 | Anderson et al. | |
| 6,691,165 B1 | 2/2004 | Bruck et al. | |
| 6,701,368 B1 | 3/2004 | Chennapragada et al. | |
| 6,725,253 B1* | 4/2004 | Okano et al. | 709/203 |
| 6,745,241 B1 | 6/2004 | French et al. | 709/221 |
| 6,748,416 B2 | 6/2004 | Carpenter et al. | |
| 6,754,699 B2 | 6/2004 | Swildens et al. | |
| 6,754,706 B1* | 6/2004 | Swildens | H04L 29/06 709/219 |
| 6,760,775 B1 | 7/2004 | Anerousis | |
| 6,772,211 B2 | 8/2004 | Lu et al. | |
| 6,775,230 B1 | 8/2004 | Watanabe et al. | |
| 6,779,017 B1 | 8/2004 | Lamberton et al. | |
| 6,785,704 B1 | 8/2004 | McCanne | |
| 6,789,125 B1 | 9/2004 | Aviani et al. | 709/238 |
| 6,795,434 B1 | 9/2004 | Kumar et al. | |
| 6,795,858 B1 | 9/2004 | Jain et al. | |
| 6,795,860 B1 | 9/2004 | Shah | |
| 6,801,949 B1 | 10/2004 | Bruck et al. | |
| 6,810,411 B1 | 10/2004 | Coughlin et al. | |
| 6,826,198 B2 | 11/2004 | Turina et al. | 370/467 |
| 6,839,700 B2 | 1/2005 | Doyle et al. | |
| 6,850,984 B1 | 2/2005 | Kalkunte et al. | 709/229 |
| 6,862,627 B1* | 3/2005 | Cheshire | 709/227 |
| 6,874,152 B2 | 3/2005 | Vermeire et al. | |
| 6,879,995 B1 | 4/2005 | Chinta et al. | 709/204 |
| 6,880,000 B1 | 4/2005 | Tominaga et al. | |
| 6,883,028 B1 | 4/2005 | Johnson et al. | |
| 6,898,633 B1 | 5/2005 | Lyndersay et al. | 709/226 |
| 6,901,081 B1 | 5/2005 | Ludwig | |
| 6,920,498 B1 | 7/2005 | Gourlay et al. | |
| 6,928,485 B1 | 8/2005 | Krishnamurthy et al. | |
| 6,950,848 B1 | 9/2005 | Yousefi'zadeh | |
| 6,963,914 B1 | 11/2005 | Breibart et al. | 709/226 |
| 6,963,917 B1 | 11/2005 | Callis et al. | 709/227 |
| 6,985,956 B2 | 1/2006 | Luke et al. | 709/229 |
| 6,987,763 B2 | 1/2006 | Rochberger et al. | 370/389 |
| 6,996,551 B2 | 2/2006 | Hellerstein et al. | |
| 6,996,615 B1 | 2/2006 | McGuire | 709/226 |
| 6,996,616 B1 | 2/2006 | Leighton et al. | 709/226 |
| 7,000,007 B1 | 2/2006 | Valenti | 709/219 |
| 7,020,698 B2 | 3/2006 | Andrews et al. | 709/223 |
| 7,020,714 B2 | 3/2006 | Kalyanaraman et al. | |
| 7,028,083 B2 | 4/2006 | Levine et al. | |
| 7,032,010 B1 | 4/2006 | Swildens et al. | 709/219 |
| 7,032,031 B2 | 4/2006 | Jungck et al. | 709/246 |
| 7,036,039 B2 | 4/2006 | Holland | |
| 7,047,300 B1 | 5/2006 | Oehrke et al. | |
| 7,058,706 B1 | 6/2006 | Iyer et al. | |
| 7,058,717 B2 | 6/2006 | Chao et al. | |
| 7,062,642 B1 | 6/2006 | Langrind et al. | |
| 7,062,562 B1 | 7/2006 | Baker et al. | |
| 7,080,138 B1 | 7/2006 | Baker et al. | |
| 7,082,102 B1 | 7/2006 | Wright | |
| 7,086,061 B1 | 8/2006 | Joshi et al. | |
| 7,089,293 B2 | 8/2006 | Grosner et al. | 709/217 |
| 7,099,915 B1 | 8/2006 | Tenereillo et al. | |
| 7,114,008 B2 | 9/2006 | Jungck et al. | 709/246 |
| 7,117,269 B2 | 10/2006 | Lu et al. | |
| 7,117,530 B1 | 10/2006 | Lin | |
| 7,124,188 B2 | 10/2006 | Mangipudi et al. | |
| 7,127,713 B2 | 10/2006 | Davis et al. | |
| 7,136,932 B1 | 11/2006 | Schneider et al. | 709/245 |
| 7,139,242 B2 | 11/2006 | Bays | |
| 7,177,933 B2 | 2/2007 | Foth | |
| 7,185,052 B2* | 2/2007 | Day | 709/203 |
| 7,194,553 B2* | 3/2007 | Lucco et al. | 709/245 |
| 7,197,547 B1 | 3/2007 | Miller et al. | |
| 7,206,806 B2 | 4/2007 | Pineau | |
| 7,213,068 B1 | 5/2007 | Kohli et al. | |
| 7,225,236 B1 | 5/2007 | Puthiyandyil et al. | |
| 7,225,272 B2* | 5/2007 | Kelley et al. | 709/245 |
| 7,240,015 B1 | 7/2007 | Karmouch et al. | |
| 7,240,100 B1 | 7/2007 | Wein et al. | 709/214 |
| 7,254,626 B1 | 8/2007 | Kommula et al. | |
| 7,257,642 B1 | 8/2007 | Bridger et al. | |

(56) References Cited

U.S. PATENT DOCUMENTS

| | | |
|---|---|---|
| 7,260,645 B2 | 8/2007 | Bays |
| 7,277,954 B1 | 10/2007 | Stewart et al. |
| 7,289,519 B1* | 10/2007 | Liskov ............... 370/400 |
| 7,296,088 B1 | 11/2007 | Padmanabhan et al. |
| 7,321,926 B1 | 1/2008 | Zhang et al. |
| 7,330,908 B2 | 2/2008 | Jungck .............. 709/246 |
| 7,383,288 B2 | 6/2008 | Miloushev et al. ......... 707/200 |
| 7,423,977 B1 | 9/2008 | Joshi et al. |
| 7,441,045 B2 | 10/2008 | Skene et al. |
| 7,454,500 B1 | 11/2008 | Hsu et al. |
| 7,478,148 B2 | 1/2009 | Neerdaels |
| 7,496,651 B1 | 2/2009 | Joshi |
| 7,523,181 B2 | 4/2009 | Swildens et al. |
| 7,573,886 B1 | 8/2009 | Ono |
| 7,574,508 B1 | 8/2009 | Kommula |
| 7,581,006 B1 | 8/2009 | Lara et al. |
| 7,581,009 B1 | 8/2009 | Hsu et al. |
| 7,584,262 B1 | 9/2009 | Wang et al. |
| 7,584,301 B1 | 9/2009 | Joshi |
| 7,653,700 B1 | 1/2010 | Bahl et al. |
| 7,657,629 B1 | 2/2010 | Kommula |
| 7,676,576 B1 | 3/2010 | Kommula |
| 7,734,683 B1 | 6/2010 | Bergenwall et al. |
| 7,756,965 B2 | 7/2010 | Joshi |
| 7,840,678 B2 | 11/2010 | Joshi |
| 7,860,964 B2* | 12/2010 | Brady et al. ............ 709/223 |
| 7,885,188 B2 | 2/2011 | Joshi |
| 7,899,899 B2 | 3/2011 | Joshi |
| 7,899,911 B2 | 3/2011 | Jensen et al. |
| 7,925,713 B1 | 4/2011 | Day et al. |
| 7,949,757 B2 | 5/2011 | Joshi |
| 8,024,441 B2 | 9/2011 | Kommula et al. |
| 8,527,639 B1 | 9/2013 | Liskov et al. |
| 2001/0049741 A1 | 12/2001 | Skene et al. |
| 2001/0052016 A1* | 12/2001 | Skene et al. .............. 709/226 |
| 2002/0026551 A1 | 2/2002 | Kamimaki et al. ........... 710/260 |
| 2002/0038360 A1 | 3/2002 | Andrews et al. ........... 709/223 |
| 2002/0049778 A1 | 4/2002 | Bell et al. |
| 2002/0055939 A1 | 5/2002 | Nardone et al. |
| 2002/0059170 A1 | 5/2002 | Vange |
| 2002/0059464 A1 | 5/2002 | Hata et al. |
| 2002/0062372 A1 | 5/2002 | Hong et al. ............ 709/225 |
| 2002/0078233 A1 | 6/2002 | Biliris et al. ............ 709/238 |
| 2002/0087722 A1 | 6/2002 | Datta et al. |
| 2002/0091840 A1 | 7/2002 | Pulier et al. ............ 709/228 |
| 2002/0107841 A1 | 8/2002 | Hellerstein et al. |
| 2002/0112036 A1 | 8/2002 | Bohannon et al. ........... 709/220 |
| 2002/0120743 A1 | 8/2002 | Shabtay et al. ............ 709/226 |
| 2002/0120763 A1* | 8/2002 | Miloushev et al. .......... 709/230 |
| 2002/0124080 A1* | 9/2002 | Leighton ............... H04L 29/06 709/224 |
| 2002/0124096 A1 | 9/2002 | Loguinov et al. |
| 2002/0133601 A1 | 9/2002 | Kennamer et al. ........... 709/229 |
| 2002/0150048 A1 | 10/2002 | Ha et al. |
| 2002/0154600 A1 | 10/2002 | Ido et al. |
| 2002/0156916 A1 | 10/2002 | Watanabe |
| 2002/0186698 A1 | 12/2002 | Ceniza |
| 2002/0188862 A1 | 12/2002 | Trethewey et al. ......... 703/201 |
| 2002/0194324 A1 | 12/2002 | Guha |
| 2002/0194335 A1 | 12/2002 | Maynard ............... 709/225 |
| 2003/0018796 A1 | 1/2003 | Chou et al. |
| 2003/0031185 A1 | 2/2003 | Kikuchi et al. |
| 2003/0035430 A1 | 2/2003 | Islam et al. ............ 370/401 |
| 2003/0229697 A1 | 2/2003 | Borella |
| 2003/0065711 A1 | 4/2003 | Acharya et al. ............ 709/203 |
| 2003/0065762 A1* | 4/2003 | Stolorz et al. ............ 709/223 |
| 2003/0065763 A1 | 4/2003 | Swildens et al. ............ 709/224 |
| 2003/0074472 A1* | 4/2003 | Lucco et al. ............ 709/245 |
| 2003/0105797 A1 | 6/2003 | Dolev et al. ............ 709/105 |
| 2003/0115283 A1* | 6/2003 | Barbir et al. ............ 709/217 |
| 2003/0135509 A1 | 7/2003 | Davis et al. ............ 709/100 |
| 2003/0154239 A1 | 8/2003 | Davis et al. ............ 709/201 |
| 2003/0177240 A1 | 9/2003 | Gulko et al. |
| 2003/0177724 A1 | 9/2003 | Gulko et al. |
| 2003/0210686 A1 | 11/2003 | Terrell et al. ............ 370/389 |
| 2003/0210694 A1 | 11/2003 | Jayaraman et al. ........... 370/392 |
| 2004/0019680 A1 | 1/2004 | Chao et al. |
| 2004/0024872 A1 | 2/2004 | Kelley et al. ............ 709/225 |
| 2004/0039798 A1* | 2/2004 | Hotz et al. ............ 709/219 |
| 2004/0039847 A1 | 2/2004 | Persson et al. ............ 709/250 |
| 2004/0064577 A1 | 4/2004 | Dahlin et al. |
| 2004/0194102 A1 | 9/2004 | Neerdaels |
| 2004/0249939 A1 | 12/2004 | Amini et al. |
| 2004/0249971 A1 | 12/2004 | Klinker |
| 2004/0255018 A1 | 12/2004 | Taraci |
| 2004/0259565 A1 | 12/2004 | Lucidarme |
| 2005/0002410 A1 | 1/2005 | Chao et al. |
| 2005/0021883 A1 | 1/2005 | Shishizuka et al. ............ 710/20 |
| 2005/0033858 A1 | 2/2005 | Swildens et al. ............ 709/232 |
| 2005/0086295 A1 | 4/2005 | Cunningham et al. ........ 709/203 |
| 2005/0149531 A1 | 7/2005 | Srivastava ............ 707/10 |
| 2005/0169180 A1 | 8/2005 | Ludwig |
| 2005/0286416 A1 | 12/2005 | Shimonishi et al. |
| 2006/0020715 A1 | 1/2006 | Jungck ............... 709/246 |
| 2006/0036743 A1 | 2/2006 | Deng et al. |
| 2006/0167894 A1 | 7/2006 | Wunner |
| 2006/0209689 A1 | 9/2006 | Nakano et al. |
| 2007/0168448 A1 | 7/2007 | Garbow et al. |
| 2007/0168547 A1 | 7/2007 | Krywaniuk |
| 2007/0180113 A1 | 8/2007 | Van Bemmel |
| 2007/0208877 A1* | 9/2007 | Kelley et al. ............ 709/245 |
| 2008/0016233 A1* | 1/2008 | Schneider ............ 709/230 |
| 2008/0037420 A1 | 2/2008 | Tang |
| 2008/0123597 A1 | 5/2008 | Arbol et al. |
| 2008/0144784 A1 | 6/2008 | Limberg |
| 2008/0147866 A1 | 6/2008 | Stolorz et al. |
| 2008/0207200 A1 | 8/2008 | Fein et al. |
| 2010/0010991 A1 | 1/2010 | Joshi |
| 2010/0011126 A1 | 1/2010 | Hsu et al. |
| 2010/0061236 A1 | 3/2010 | Joshi |
| 2010/0082787 A1 | 4/2010 | Kommula et al. |
| 2010/0095008 A1 | 4/2010 | Joshi |
| 2010/0115133 A1 | 5/2010 | Joshi |
| 2010/0121932 A1 | 5/2010 | Josh et al. |
| 2010/0153558 A1 | 6/2010 | Kommula |
| 2010/0223621 A1 | 9/2010 | Joshi |
| 2010/0251008 A1 | 9/2010 | Swildens |
| 2010/0293296 A1 | 11/2010 | Hsu et al. |
| 2010/0299427 A1 | 11/2010 | Joshi |
| 2011/0099261 A1 | 4/2011 | Joshi |
| 2011/0122771 A1 | 5/2011 | Joshi |
| 2011/0191459 A1 | 8/2011 | Joshi |
| 2011/0264798 A1* | 10/2011 | Joshi ............... 709/224 |
| 2012/0096166 A1 | 4/2012 | Devarapalli et al. |

OTHER PUBLICATIONS

Office Action, issued in U.S. Appl. No. 10/211,822, dated Aug. 19, 2005.

Notice of Allowance, issued in U.S. Appl. No. 10/211,822, dated Mar. 7, 2006.

Office Action, issued in U.S. Appl. No. 10/377,364, dated Sep. 22, 2006.

Office Action, issued in U.S. Appl. No. 10/377,364, dated Mar. 26, 2007.

Office Action, issued in U.S. Appl. No. 10/377,364, dated Sep. 4, 2007.

Office Action, issued in U.S. Appl. No. 10/377,364, dated Apr. 9, 2008.

Office Action, issued in U.S. Appl. No. 10/377,364, dated Nov. 24, 2008.

Office Action, issued in U.S. Appl. No. 10/377,364, dated Aug. 31, 2009.

Advisory Action, issued in U.S. Appl. No. 10/377,364, dated Nov. 23, 2009.

Office Action, issued in U.S. Appl. No. 10/206,580, dated Aug. 15, 2005.

Office Action, issued in U.S. Appl. No. 10/206,580, dated Mar. 9, 2006.

Advisory Action, issued in U.S. Appl. No. 10/206,580, dated Jun. 6, 2006.

(56) References Cited

OTHER PUBLICATIONS

Office Action, issued in U.S. Appl. No. 10/206,580, dated Jul. 12, 2006.
Notice of Allowance, issued in U.S. Appl. No. 10/206,580, dated Jan. 11, 2007.
Office Action, issued in U.S. Appl. No. 10/376,903, dated Jul. 17, 2006.
Office Action, issued in U.S. Appl. No. 10/376,903, dated Jan. 12, 2007.
Office Action, issued in U.S. Appl. No. 10/376,903, dated Jun. 5, 2007.
Office Action, issued in U.S. Appl. No. 10/376,903, dated Feb. 20, 2008.
Office Action, issued in U.S. Appl. No. 10/376,903, dated Oct. 16, 2008.
Office Action, issued in U.S. Appl. No. 10/376,903, dated Mar. 4, 2009.
Office Action, issued in U.S. Appl. No. 10/214,921, dated Feb. 7, 2006.
Office Action, issued in U.S. Appl. No. 10/214,921, dated Aug. 9, 2006.
Advisory Action, issued in U.S. Appl. No. 10/214,921, dated Sep. 21, 2006.
Office Action, issued in U.S. Appl. No. 10/214,921, dated Dec. 7, 2006.
Office Action, issued in U.S. Appl. No. 10/214,921, dated Aug. 13, 2007.
Office Action, issued in U.S. Appl. No. 10/214,921, dated Nov. 15, 2007.
Office Action, issued in U.S. Appl. No. 10/214,921, dated Jun. 12, 2008.
Office Action, issued in U.S. Appl. No. 10/214,921, dated Oct. 6, 2008.
Notice of Allowance, issued in U.S. Appl. No. 10/214,921, dated Apr. 3, 2009.
Office Action, issued in U.S. Appl. No. 10/305,823, dated Jan. 12, 2006.
Office Action, issued in U.S. Appl. No. 10/305,823, dated Jul. 3, 2006.
Office Action, issued in U.S. Appl. No. 10/305,823, dated Jan. 3, 2007.
Office Action, issued in U.S. Appl. No. 10/305,823, dated Sep. 10, 2007.
Office Action, issued in U.S. Appl. No. 10/305,823, dated Mar. 24, 2008.
Advisory Action, issued in U.S. Appl. No. 10/305,823, dated Jul. 9, 2008.
Examiner's Answer, issued in U.S. Appl. No. 10/305,823, dated Mar. 4, 2009.
Supplemental Examiner's Answer, issued in U.S. Appl. No. 10/305,823, dated Apr. 13, 2009.
Office Action, issued in U.S. Appl. No. 10/674,627, dated Jun. 5, 2006.
Office Action, issued in U.S. Appl. No. 10/674,627, dated Nov. 3, 2006.
Office Action, issued in U.S. Appl. No. 10/674,627, dated Jul. 30, 2007.
Office Action, issued in U.S. Appl. No. 10/674,627, dated Apr. 11, 2008.
Office Action, issued in U.S. Appl. No. 10/674,627, dated Dec. 23, 2008.
Office Action, issued in U.S. Appl. No. 10/674,627, dated Aug. 3, 2009.
Advisory Action, issued in U.S. Appl. No. 10/674,627, dated Oct. 16, 2009.
Notice of Allowance, issued in U.S. Appl. No. 10/839,919, dated Mar. 5, 2008.
Office Action, issued in U.S. Appl. No. 10/839,919, dated Jun. 18, 2008.
Office Action, issued in U.S. Appl. No. 10/839,919, dated Dec. 9, 2008.
Notice of Allowance, issued in U.S. Appl. No. 10/839,919, dated May 14, 2009.
Office Action, issued in U.S. Appl. No. 10/840,496, dated Oct. 18, 2007.
Office Action, issued in U.S. Appl. No. 10/840,496, dated Aug. 1, 2008.
Notice of Allowance, issued in U.S. Appl. No. 10/840,496, dated Oct. 15, 2008.
Office Action, issued in U.S. Appl. No. 12/353,701, dated Nov. 4, 2009.
Office Action, issued in U.S. Appl. No. 10/924,552, dated Feb. 27, 2008.
Notice of Allowance, issued in U.S. Appl. No. 10/924,552, dated May 30, 2008.
Office Action, issued in U.S. Appl. No. 09/670,487, dated Dec. 31, 2003.
Office Action, issued in U.S. Appl. No. 09/670,487, dated Sep. 21, 2004.
Office Action, issued in U.S. Appl. No. 09/670,487, dated Mar. 15, 2005.
Office Action, issued in U.S. Appl. No. 09/670,487, dated Nov. 3, 2005.
Office Action, issued in U.S. Appl. No. 09/670,487, dated May 3, 2006.
Office Action, issued in U.S. Appl. No. 09/670,487, dated Nov. 17, 2006.
Office Action, issued in U.S. Appl. No. 09/670,487, dated Oct. 30, 2007.
Office Action, issued in U.S. Appl. No. 09/670,487, dated Jul. 22, 2008.
Notice of Allowance, issued in U.S. Appl. No. 09/670,487, dated Sep. 18, 2008.
Office Action, issued in U.S. Appl. No. 11/741,480, dated Nov. 27, 2007.
Office Action, issued in U.S. Appl. No. 11/741,480, dated Apr. 29, 2008.
Office Action, issued in U.S. Appl. No. 11/741,480, dated Oct. 31, 2008.
Notice of Allowance, issued in U.S. Appl. No. 11/741,480, dated Apr. 10, 2009.
Joshi, U.S. Appl. No. 12/787,779, filed May 26, 2010.
Office Action, issued in U.S. Appl. No. 11/707,697, dated Mar. 3, 2009.
Office Action, issued in U.S. Appl. No. 11/707,697, dated Sep. 17, 2009.
Notice of Allowance, issued in U.S. Appl. No. 10/377,364, dated Jan. 12, 2010.
Office Action, issued in U.S. Appl. No. 11/707,697, dated Jan. 12, 2010.
Notice of Allowance, issued in U.S. Appl. No. 12/353,701, dated Apr. 9, 2010.
Office Action, issued in U.S. Appl. No. 12/177,021, dated Jan. 29, 2010.
Office Action, issued in U.S. Appl. No. 12/272,618, dated Feb. 4, 2010.
F5 Networks, Inc., "Keeping Up with Multi-Service Applications," A F5 Networks, Inc. White Paper Document, Jan. 2006, 8 pages, Seattle, WA.
Citrix Systems, Inc., "NetScaler Global Server Load Balancing for Presentation Server and Access Gateway (All Editions) Deployments," Design Consideration NetScaler 8.0, 2007, 16 pages, Fort Lauderdale, FL.
F5 Networks, Inc., "Optimize Application Delivery Across Your Globally Distributed Data Centers," BIG-IP Global Traffic Manager Datasheet, 2009, 8 pages, Seattle WA.
Stalvig P., "Disaster Recovery: Not Just Planning for the Worst," A F5 Networks, Inc. White Paper Document, 2008, 16 pages, F5 Networks, Inc., Seattle, WA.
Cisco Systems, Inc., "The Global Server Load Balancing Primer," A Cisco Systems, Inc. White Paper Document, 1992-2004, 20 pages, San Jose, CA.

(56) References Cited

OTHER PUBLICATIONS

Final Office Action, dated Aug. 12, 2010, for U.S. Appl. No. 12/177,021, 6 pages.
Non-Final Office Action, dated Sep. 29, 2009, for U.S. Appl. No. 12/272,618, 16 pages.
Notice of Allowance, dated Jul. 6, 2007, for U.S. Appl. No. 10/206,580, 5 pages.
Notice of Allowance, dated Oct. 19, 2009, for U.S. Appl. No. 10/376,903, 4 pages.
Notice of Allowance, dated Aug. 19, 2010, for U.S. Appl. No. 10/674,627, 4 pages.
Civil Action 10-332, Complaint for Patent Infringement with Exhibits A-G, filed on Apr. 23, 2010, 131 pages.
Civil Action 10-332, Second Amended and Supplemental Complaint for Patent Infringement with Exhibits H-I, filed on Jul. 16, 2010, 41 pages.
Civil Action CV10-03443, Complaint for Declaratory Judgment with Exhibits A-I, filed on Aug. 6, 2010, 153 pages.
Devarapalli et al., U.S. Appl. No. 61/393,796, filed Oct. 15, 2010, 43 pages.
Devarapalli et al., U.S. Appl. No. 12/916,390, filed Oct. 29, 2010, 45 pages.
Joshi, U.S. Appl. No. 12/938,232, filed Nov. 2, 2010, 28 pages.
Non-Final Office Action for U.S. Appl. No. 12/496,560, dated Sep. 17, 2010, 27 pages.
Final Office Action for U.S. Appl. No. 12/272,618, dated Nov. 26, 2010, 19 pages.
Non-Final Office Action for U.S. Appl. No. 11/707,697, dated Nov. 22, 2010, 24 pages.
Non-Final Office Action for U.S. Appl. No. 12/635,371, dated Oct. 7, 2010, 44 pages.
Notice of Allowance for U.S. Appl. No. 12/506,130, dated Oct. 12, 2010, 49 pages.
Joshi, U.S. Appl. No. 13/008,321, filed Jan. 18, 2011, 29 pages.
Network Working Group, Request for Comments (RFC) 4033, "DNS Security Introduction and Requirements," Mar. 2005, 22 pages.
Network Working Group, Request for Comments (RFC) 4034, "Resource Records for the DNS Security Extensions," Mar. 2005, 31 pages.
Network Working Group, Request for Comments (RFC) 4035, "Protocol Modifications for the DNS Security Extensions," Mar. 2005, 55 pages.
National Institute of Standards and Technology (NIST), "Secure Domain Name System (DNS) Deployment Guide," Special Publication 800-81, May 2006, 103 pages.
CMP Media LLC, "VeriSign DNSSEC Interop Lab Adds Brocade, A10 Networks, BlueCat Networks," Jun. 29, 2010, can be retrieved from http://www.darkreading.com/story/showArticle.jhtml?articleID=225701776, 3 pages.
Meyer, Nathan et al., "F5 and Infoblox DNS Integrated Architecture: Offering a Complete Scalable, Secure DNS Solution," A F5 Networks, Inc. Technical Brief, 2010, 18 pages, Seattle, WA.
Silva, Peter, "DNSSEC: The Antidote to DNS Cache Poisoning and Other DNS Attacks," A F5 Networks, Inc. Technical Brief, 2009, 10 pages, Seattle, WA.
Wikimedia Foundation, Inc., "Domain Name Security Extensions," retrieved Oct. 22, 2010, from http://en.wikipedia.org/wiki/Domain_Name_System_Security_Extensions, 17 pages.
A10 Networks, Inc., "A10 Networks Announces Unique and Wide Ranging Customer-Driven Functionality for AX Series Application Delivery Controllers," News Release, Oct. 18, 2010, from http://www.a10networks.com/news/2010/101018-AX_Series_2.6.php, 2 pages.
Civil Action 10-332, Report on the Filing or Determination of an Action Regarding a Patent or Trademark, filed on Aug. 5, 2010, 2 pages.
Civil Action 10-332, Notice of Voluntary Dismissal Without Prejudice, filed on Aug. 5, 2010, 2 pages.
Civil Action CV10-03428, Complaint for Patent Infringement, Trade Secret Misappropriation, Breach of Contract, Interference with Prospective Economic Advantage, Interference with Contract, and Unfair Competition Under Cal. Bus. & Prof. Code §§ 17200 et seq., filed on Aug. 4, 2010, with Exhibits A-M, 196 pages.
Civil Action CV10-03428, First Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Oct. 29, 2010, 38 pages.
U.S. Appl. No. 11/707,697, filed Feb. 16, 2007, Kommula et al.
U.S. Appl. No. 60/347,481, filed Jan. 11, 2002, Tsimelzon et al.
Genova, Z., et al., "Challenges in URL Switching for Implementing Globally Distributed Web Sites," Department of Computer Science and Engineering, University of South Florida, pp. 1-9, Aug. 11, 2000.
Albitz, P., et al., "DNS and BIND in a Nutshell," O'Reilly & Associates, Sebastopol, CA, 1992, pp. 214-215.
Alteon Systems, "Alteon WebSystems Introduces New Layer 4+ Switching Technology that Speeds User Access to Internet Servers," Dec. 7, 1998, retrieved Nov. 5, 2002, from http://web.archive.org/web/20000919190409/www.alteonwebsystems.com/press/releases/1998/120798.asp, pp. 1-4.
Alteon WebSystems, Inc., "Enhancing Web User Experience with Global Server Load Balancing," Jun. 1999, 8 pages.
Krapf, E., "Alteon's Global Server Load Balancing," *Business Communications Review,* Jan. 1999, p. 60, retrieved Oct. 25, 2002, from http://www.bcr.com/bcrmag/1999/01/p60.asp, 3 pages.
Nortel Networks, "Alteon Personal Content Director," © 2001, can be retrieved from http://www.nortelnetworks.com/personalinternet, 4 pages.
IBM Corp., *IBM WebSphere Performance Pack: Load Balancing with IBM SecureWay Network Dispatcher,* First Edition, Chapters 1, 2, 4, and 8, Oct. 1999.
IBM Corp., *SecureWay® Network Dispatcher: User's Guide—Version 2.1 for AIX, Solaris, and Windows NT,* Third Edition, Chapters 3, 4, 9, 10, 11, and Appendices C & E, Mar. 1999.
Yerxa, G., "ACElerate on Fast Track for Load-Balancing," Mar. 8, 1999, retrieved Nov. 5, 2002, from http://www.networkcomputing.com/1005/1005sp2.html, pp. 1-4.
U.S. Appl. No. 12/353,701, filed Jan. 14, 2009.
Doeringer et al., "Routing on Longest-Matching Prefixes," IEEE/ACM Transactions on Networking, vol. 4, No. 1, Feb. 1996, pp. 86-97.
Hsu et al., "Global Server Load Balancing," U.S. Appl. No. 11/741,480, filed Apr. 27, 2007.
Hsu et al., "Global Server Load Balancing," U.S. Appl. No. 12/272,618, filed Nov. 17, 2008.
Joshi, "Smoothing Algorithm for Round Trip Time (RTT) Measurements," assigned U.S. Appl. No. 12/177,021, filed Jul. 21, 2008.
Bestavros, Azer, "WWW Traffic Reduction and Load Balancing through Server-Based Caching," *IEEE Concurrency,* pp. 56-67, Jan.-Mar. 1997.
Paul, Arindam et al., "Balancing Web Server Load for Adaptable Video Distribution," *IEEE* pp. 469-476, 2000.
Cisco Document, "Configuring the CSS Domain Name Service,", posted on Dec. 2000, Cisco Systems Inc., http://www.ciscosystems.com, pp. 1-13.
Venkataramani, A., et al., "TCP Nice: A Mechanism for Background Transfer," Proceedings of the Fifth Symposium on Operating Systems Design and Implementation (OSDI'02), ISBN:1-931971-06-4, 329-343, 2002.
U.S. Appl. No. 09/670,487, filed Sep. 26, 2000, Hsu et al.
U.S. Appl. No. 10/206,580, filed Jul. 25, 2002, Kommula et al.
U.S. Appl. No. 10/305,823, filed Nov. 27, 2002, Joshi et al.
U.S. Appl. No. 10/376,903, filed Feb. 28, 2003, Kommula.
U.S. Appl. No. 10/377,364, filed Feb. 28, 2003, Kommula.
U.S. Appl. No. 10/674,627, filed Sep. 29, 2003, Joshi.
U.S. Appl. No. 10/839,919, filed May 6, 2004, Joshi.
U.S. Appl. No. 10/840,496, filed May 6, 2004, Joshi.
U.S. Appl. No. 10/924,552, filed Aug. 23, 2004, Joshi.

(56) References Cited

OTHER PUBLICATIONS

U.S. Appl. No. 11/429,177, filed May 5, 2006, Joshi et al.
AlteonWebSystems, "PCD White Paper," *AlteonWebSystems*, pp. 1-8, Mar. 2001.
Cardellini, V., et al., "Dynamic Load Balancing on Web-server Systems," *IEEE Internet Computing*, 3(3):28-39, May-Jun. 1999.
Foundry Networks, Inc., "Server Load Balancing in Today's Web-enabled Enterprises," *White Paper*, pp. 1-10, Apr. 2002.
Genova, Z., et al., "Challenges in URL Switching for Implementing Globally Distributed Web Sites," *IEEE*, pp. 89-94, 2000.
Final Office Action for Reexamination Control No. 90/011,772, dated May 17, 2012, 53 pages.
Final Office Action for Reexamination Control No. 90/011,765, dated May 16, 2012, 59 pages.
Decision on Request for Rehearing for U.S. Appl. No. 10/305,823, mailed on Nov. 1, 2011, 5 pages.
Request for Reexamination of U.S. Pat. No. 7,584,301, filed Jun. 27, 2011, 36 pages.
Notice of Reexamination Request Filing Date and Notice of Assignment of Reexamination Request, mailed Jul. 6, 2011, Reexamination Control No. 90/011,765, 2 pages.
Ex Parte Interview Summary for Reexamination Control No. 90/011,765, Jul. 6, 2011, 3 pages.
Order Granting Request for Reexamination of U.S. Pat. No. 7,584,301, mailed Aug. 8, 2011, Reexamination Control No. 90/011,765, 10 pages.
Office Action in Ex Parte Reexamination for Control No. 90/011,765, dated Oct. 13, 2011, 7 pages.
Ex Parte Reexamination Interview Summary for Reexamination Control No. 90/011,765, dated Nov. 29, 2011, 57 pages.
Decision on Petition for Extension of Time in Reexamination (Granted), mailed Dec. 9, 2011, Reexamination Control No. 90/011,765, 3 pages.
Request for Inter Partes Reexamination of U.S. Pat. No. 7,584,301, filed Nov. 8, 2011, 194 pages.
Notice of Inter Partes Reexamination Request Filing Date and Notice of Assignment of Inter Partes Reexamination Request, mailed Nov. 21, 2011, Reexamination Control No. 95/001,812, 2 pages.
Order Granting Request for Inter Partes Reexamination of U.S. Pat. No. 7,584,301 and Office Action for Reexamination Control No. 95/001,812, mailed Dec. 28, 2011, 25 pages.
Third Party Requester's Comments under 35 U.S.C. § 314(B)(2) and 37 C.F.R. § 1.947, for Reexamination Control No. 95/001,812, filed Mar. 29, 2012, 33 pages.
Request for Reexamination of U.S. Pat. No. 7,840,678, filed Jun. 27, 2011, 25 pages.
Notice of Reexamination Request Filing Date and Notice of Assignment of Reexamination Request, mailed Jul. 1, 2011, Reexamination Control No. 90/011,763, 2 pages.
Ex Parte Interview Summary for Reexamination Control No. 90/011,763, mailed Jul. 5, 2011, 3 pages.
Order Granting Request for Reexamination of U.S. Pat. No. 7,840,678, mailed Jul. 29, 2011, Reexamination Control No. 90/011,763, 10 pages.
Office Action for Reexamination Control No. 90/011,763, dated Oct. 4, 2011, 7 pages.
Decision on Petition for Extension of Time in Reexamination (Granted), mailed Nov. 17, 2011, Reexamination Control No. 90/011,763, 3 pages.
Ex Parte Reexamination Interview Summary for Reexamination Control No. 90/011,763, mailed on Nov. 29, 2011, 57 pages.
Final Office Action for Reexamination Control No. 90/011,763, dated Apr. 25, 2012, 51 pages.
Request for Inter Partes Reexamination for U.S. Pat. No. 7,840,678, mailed on Nov. 17, 2011, 164 pages.
Notice of Inter Partes Reexamination Request Filing Date and Notice of Assignment of Inter Partes Reexamination Request, mailed Nov. 23, 2011, Reexamination Control No. 95/001,822, 2 pages.
Order Granting Request for Inter Partes Reexamination of U.S. Pat. No. 7,840,678 and Office Action for Reexamination Control No. 95/001,822, dated Jan. 12, 2012, 21 pages.
Third Party Requester's Comments under 35 U.S.C. § 314(B)(2) and 37 C.F.R. § 1.947, for Reexamination Control No. 95/001,822, filed Apr. 11, 2012, 37 pages.
Action Closing Prosecution, for Reexamination Control No. 95/001,822, mailed May 5, 2012, 45 pages.
Final Office Action for Reexamination Control No. 90/011,761, dated Mar. 26, 2012, 17 pages.
Order Granting Request for Inter Partes Reexamination of U.S. Pat. No. 7,756,965, mailed Feb. 13, 2012, Reexamination Control No. 95/001,827, 18 pages.
Order Granting Request for Inter Partes Reexamination of U.S. Pat. No. 7,899,899 and Office Action for Reexamination Control No. 95/001,826, mailed Feb. 7, 2012, 19 pages.
Request for Reexamination of U.S. Pat. No. 7,581,009, filed Jun. 27, 2011, 58 pages.
Notice of Reexamination Request Filing Date and Notice of Assignment of Reexamination Request, mailed Jul. 8, 2011, Reexamination Control No. 90/011,770, 2 pages.
Ex Parte Reexamination Interview Summary, for Reexamination Control No. 90/011,770, mailed Jul. 18, 2011, 2 pages.
Order Granting Request for Reexamination of U.S. Pat. No. 7,581,009, mailed Sep. 21, 2011, Reexamination Control No. 90/011,770, 14 pages.
Office Action for Reexamination Control No. 90/011,770, dated Feb. 16, 2012, 35 pages.
Ex Parte Reexamination Interview Summary, for Reexamination Control No. 90/011,770, dated Mar. 27, 2012, 3 pages.
Decision on Petition for Extension of Time in Reexamination (Granted), mailed Mar. 28, 2012, Reexamination Control No. 90/011,770, 3 pages.
Request for Inter Partes Reexamination of U.S. Pat. No. 7,581,009, filed Nov. 4, 2011, 197 pages.
Notice of Assignment of Inter Partes Reexamination Request and Notice of Reexamination Request Filing Date, mailed Nov. 10, 2011, Reexamination Control No. 95/001,807, 2 pages.
Order Granting Request for Inter Partes Reexamination of U.S. Pat. No. 7,581,009 and Office Action for Reexamination Control No. 95/001,807, dated Jan. 31, 2012, 23 pages.
Decision on Petition for Extension of Time in Reexamination (Granted), mailed Mar. 30, 2012, Reexamination Control No. 95/001,807, 3 pages.
Third Party Requester's Opposition to Petition to Vacate, for Reexamination Control No. 95/001,807, filed Apr. 16, 2012, 17 pages.
Final Office Action for U.S. Appl. No. 12/496,560, dated Jan. 28, 2011, 10 pages.
Notice of Allowance for U.S. Appl. No. 12/496,560, dated May 16, 2011, 11 pages.
Office Communication for U.S. Appl. No. 12/496,560, dated Jun. 14, 2011, 5 pages.
Non-Final Office Action for U.S. Appl. No. 12/272,618, dated Jun. 14, 2011, 13 pages.
Final Office Action for U.S. Appl. No. 12/272,618, dated Feb. 28, 2012, 12 pages.
Non-Final Office Action for U.S. Appl. No. 11/429,177, dated May 19, 2011, 87 pages.
Non-Final Office Action for U.S. Appl. No. 11/429,177, dated Oct. 18, 2011, 25 pages.
Request for Reexamination of U.S. Pat. No. 7,657,629, filed Jun. 27, 2011, 36 pages.
Notice of Reexamination Request Filing Date and Notice of Assignment of Reexamination Request, mailed Jul. 7, 2011, Reexamination Control No. 90/011,766, 2 pages.
Ex Parte Interview Summary for Reexamination Control No. 90/011,766, Jul. 14, 2011, 3 pages.
Order Granting Request for Reexamination of U.S. Pat. No. 7,657,629, mailed Jul. 30, 2011, Reexamination Control No. 90/011,766, 10 pages.
Office Action for Reexamination Control No. 90/011,766, dated Oct. 4, 2011, 7 pages.

(56) References Cited

OTHER PUBLICATIONS

Ex Parte Reexamination Interview Summary for Reexamination Control No. 90/011,766, mailed on Nov. 29, 2011, 57 pages.
Decision on Petition for Extension of Time in Reexamination (Granted), mailed Dec. 2, 2011, Reexamination Control No. 90/011,766, 3 pages.
Request for Inter Partes Reexamination for U.S. Pat. No. 7,657,629 B1, filed Nov. 17, 2011, 238 pages.
Notice of Inter Partes Reexamination Request Filing Date and Notice of Assignment of Inter Partes Reexamination Request, mailed Dec. 5, 2011, Reexamination Control No. 95/001,824, 2 pages.
Order Granting Request for Inter Partes Reexamination of U.S. Pat. No. 7,657,629 and Office Action for Reexamination Control No. 95/001,824, dated Jan. 12, 2012, 33 pages.
Third Party Requester's Comments under 35 U.S.C. § 314(B)(2) and 37 C.F.R. § 1.947, for Reexamination Control No. 95/001,824, filed Apr. 11, 2012, 21 pages.
Final Office Action for U.S. Appl. No. 11/707,697, dated Apr. 20, 2011, 10 pages.
Notice of Allowance for U.S. Appl. No. 11/707,697, dated Aug. 5, 2011, 9 pages.
Notice of Allowance for U.S. Appl. No. 11/707,697, dated Aug. 12, 2011, 6 pages.
Final Office Action for U.S. Appl. No. 12/635,371, dated Mar. 16, 2011, 7 pages.
Office Communication for U.S. Appl. No. 12/635,371, dated Mar. 24, 2011, 29 pages.
Non-Final Office Action for U.S. Appl. No. 12/635,371, dated Jun. 8, 2011, 9 pages.
Non-Final Office Action for U.S. Appl. No. 12/635,371, dated Feb. 15, 2012, 10 pages.
Request for Reexamination of U.S. Pat. No. 7,574,508, filed Jun. 27, 2011, 21 pages.
Notice of Reexamination Request Filing Date and Notice of Assignment of Reexamination Request, mailed Jun. 29, 2011, Reexamination Control No. 90/011,764, 2 pages.
Ex Parte Interview Summary for Reexamination Control No. 90/011,764, Jul. 21, 2011, 3 pages.
Order Granting Request for Reexamination of U.S. Pat. No. 7,574,508, mailed Jul. 22, 2011, Reexamination Control No. 90/011,764, 15 pages.
Office Action for Reexamination Control No. 90/011,764, dated Nov. 14, 2011, 18 pages.
Office Action for Reexamination Control No. 90/011,764, dated Nov. 18, 2011, 18 pages.
Decision on Petition for Extension of Time in Reexamination (Granted), mailed Jan. 3, 2012, Reexamination Control No. 90/011,764, 3 pages.
Ex Parte Reexamination Interview Summary for Reexamination Control No. 90/011,764, mailed on Jan. 6, 2012, 52 pages.
Request for Inter Partes Reexamination of U.S. Pat. No. 7,574,508, filed Nov. 4, 2011, 70 pages.
Notice of Inter Partes Reexamination Request Filing Date and Notice of Assignment of Inter Partes Reexamination Request, mailed Nov. 8, 2011, Reexamination Control No. 95/001,804, 2 pages.
Order Granting Request for Inter Partes Reexamination of U.S. Pat. No. 7,574,508 and Office Action for Reexamination Control No. 95/001,804, dated Dec. 8, 2011, 20 pages.
Third Party Requester's Comments under 35 U.S.C. § 314(B)(2) and 37 C.F.R. § 1.947, with Exhibits A-E, for Reexamination Control No. 95/001,804, filed Mar. 9, 2012, 79 pages.
Decision on Appeal for U.S. Appl. No. 10/305,823, mailed on Jul. 11, 2011, 10 pages.
Joshi et al., U.S. Appl. No. 13/229,380, filed Sep. 9, 2011.
Civil Action CV10-03428, Second Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., with Exhibits A-P, filed on Apr. 13, 2011, 238 pages.
Civil Action CV10-03428, Third Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Apr. 29, 2011, 42 pages.
Civil Action CV10-03428, Answer to Third Amended Complaint, Affirmative Defenses, and Counterclaims, filed on May 16, 2011, 40 pages.
Civil Action CV10-03428, Answer to Defendant A10 Networks, Inc.'s Counterclaims, and Counterclaim, filed on May 27, 2011, 12 pages.
Delgadillo, K., "Cisco Distributed Director," Cisco White Paper, 1999, 19 pages.
Table of Contents for 2nd Conference on Telecommunications (ConfTele'99), Apr. 15-16, 1999, 9 pages.
Bernardo, L. et al., "Scalability Issues in Telecommunication Services," In Proceedings of 2nd Conference on Telecommunications (ConfTele'99), Apr. 15-16, 1999, pp. 409-413.
Lin, "VPN Tunnel Balancer," U.S. Appl. No. 60/169,502, filed Dec. 7, 1999, 7 pages.
Cisco Systems, Inc., "Cisco LocalDirector Version 1.6.3 Release Notes," Oct. 1997, 52 pages, San Jose, CA.
Foundry Networks, Inc., "Foundry ServerIron Installation and Configuration Guide," May 2000, 784 pages.
Dell Computer Corporation, "3-DNS Reference Guide, Version 4.2," 2002, 261 pages.
Schemers III, "Ibnamed: A Load Balancing Name Server in Perl," 1995 LISA IX, Sep. 17-22, 1995, Monterey, CA, 13 pages.
Goldszmidt, "Load Distribution for Scalable Web Servers: Summer Olympics 1996," In Proceedings of the 8th IFIP/IEEE International Workshop on Distributed Systems: Operations and Management, Sydney, Australia, Oct. 1997, 10 pages.
"Use F5 Networks' 3DNS Controller to Supercharge Standard DNS Capabilities," Jul. 1999, F5 White Paper, Seattle, WA.
Buyya, "High Performance Cluster Computing: Architectures and Systems," vol. 1, copyright 1999, Prentice Hall PTR, Upper Saddle River, New Jersey 07458, http://www.phptr.com.
Civil Action CV10-03428—A10 Networks, Inc.'s Answer to Plaintiffs Brocade Communications Systems, Inc. and Foundry Networks, LLC's Counterclaims, Filed Jun. 17, 2011, 4 pages.
Civil Action CV10-03428—Notice of Granted Requests for Reexamination of U.S. Pat. No. 7,547,508 and U.S. Pat. No. 7,270,977, Filed Aug. 1, 2011, 31 pages, including Exhibits A and B.
Civil Action CV10-03428—Notice of Granted Requests for Reexamination of U.S. Pat. No. 7,558,195, U.S. Pat. No. 7,657,629, U.S. Pat. No. 7,840,678, Filed Aug. 5, 2011, 316 pages.
Civil Action CV10-03428—Notice of Granted Requests for Reexamination of U.S. Pat. No. 7,584,301, Filed Aug. 12, 2011, 14 pages, including Exhibit A.
Civil Action CV10-03428—Joint Claim Construction, Filed Aug. 26, 2011, 29 pages.
Civil Action CV10-03428—Notice of Granted Requests for Reexamination of U.S. Pat. No. 7,774,833; U.S. Pat. No. 7,454,500; U.S. Pat. No. 7,899,899; U.S. Pat. No. 7,754,965; U.S. Pat. No. 7,647,427; and U.S. Pat. No. 7,716,370, Filed Sep. 6, 2011, 72 pages, including Exhibits A through F.
Civil Action CV10-03428—Defendant's A10 Networks, Inc.'s, Lee Chen's, Rajkumar Jalan's, Ron Szeto's, David Cheung's, Liang Han's, and Steven Hwang's Invalidity Contentions, Filed Jun. 27, 2011, 779 pages, Including Exhibits A through M.
Skene et al., "Method and System for Balancing Load Distribution on a Wide Area Network," U.S. Appl. No. 09/459,815, filed Dec. 13, 1999, 59 pages.
Skene et al., "Method and System for Name Server Load Balancing," U.S. Appl. No. 60/182,812, filed Feb. 16, 2000, 16 pages.
Tsimelzon et al., "Java application framework for an Internet content delivery network," U.S. Appl. No. 60/347,481, filed Jan. 11, 2002, 26 pages.

(56) References Cited

OTHER PUBLICATIONS

"Foundry Networks Announces Application Aware Layer 7 Switching on ServerIron Platform," Mar. 1999, 4 pages.
Order Construing Disputed Claim Terms of U.S. Pat. No. 7,647,427; U.S. Pat. No. 7,716,370; U.S. Pat. No. 7,558,195; U.S. Pat. No. 7,454,500; U.S. Pat. No. 7,581,009; U.S. Pat. No. 7,657,629; U.S. Pat. No. 7,584,301; U.S. Pat. No. 7,840,678; and U.S. Pat. No. 5,875,185, issued Jan. 6, 2012, 33 pages.
Information Disclosure Statement filed on Apr. 4, 2004, for U.S. Pat. No. 7,308,475, 5 pages.
Release Note: 3-DNS Controller, version 4.5, Mar. 5, 2007, 19 pages.
F5 Networks' Newest Wide Area Traffic Management Solution Enables Enterprises to Meet Global e-Business Objectives, Business Wire, Feb. 19, 2002, 4 pages.
Release Note: 3-DNS Controller, version 4.2, Feb. 13, 2002, 23 pages.
Huang et al., "A DNS Reflection Method for Global Traffic Management," Proceedings USENIX Annual Technical Conference (ATC'10), 2010, 7 pages.
Request for Reexamination of U.S. Pat. No. 7,454,500, filed Jun. 27, 2011, 29 pages.
Notice of Reexamination Request Filing Date and Notice of Assignment of Reexamination Request, mailed Jul. 1, 2011, Reexamination Control No. 90/011,772, 2 pages.
Ex Parte Reexamination Interview Summary for Reexamination Control No. 90/011,772, mailed Jul. 21, 2011, 3 pages.
Order Granting Request for Reexamination of U.S. Pat. No. 7,454,500, mailed Aug. 12, 2011, Reexamination Control No. 90/011,772, 11 pages.
Office Action for Reexamination Control No. 90/011,772, dated Oct. 13, 2011, 8 pages.
Decision on Petition for Extension of Time in Reexamination (Granted), mailed Nov. 17, 2011, Reexamination Control No. 90/011,772, 3 pages.
Ex Parte Reexamination Interview Summary for Reexamination Control No. 90/011,772, mailed on Nov. 29, 2011, 58 pages.
Ex Parte Reexamination Interview Summary for Reexamination Control No. 90/011,772, mailed on Apr. 10, 2012, 3 pages.
Request for Inter Partes Reexamination of U.S. Pat. No. 7,454,500, filed Nov. 4, 2011, 157 pages.
Notice of Assignment of Inter Partes Reexamination Request and Notice of Reexamination Request Filing Date, mailed Nov. 18, 2011, Reexamination Control No. 95/001,806, 2 pages.
Order Granting Request for Inter Partes Reexamination of U.S. Pat. No. 7,454,500 and Office Action for Reexamination Control No. 95/001,806, dated Dec. 16, 2011, 43 pages.
Third Party Requester's Opposition to Petition to Vacate, for Reexamination Control No. 95/001,806, filed Mar. 1, 2012, 15 pages.
Third Party Requester's Opposition to Petition to Suspend Reexamination for Reexamination Control No. 95/001,806, filed Mar. 2, 2012, 14 pages.
Third Party Requester's Comments under 35 U.S.C. § 314(B)(2) and 37 C.F.R. § 1.947, for Reexamination Control No. 95/001,806, filed Mar. 19, 2012, 36 pages.
Third Party Requester's Opposition to Patent Owner's Petition to "Supplement," for Reexamination Control No. 95/001,806, filed Apr. 19, 2012, 21 pages.
Terminal Disclaimer for U.S. Appl. No. 11/741,480, filed Jan. 29, 2008, 1 page.
Civil Action 10-332—*Brocade Communication Systems, Inc.* v. *A10 Networks, Inc.*—Civil Cover Sheet, filed on Apr. 23, 2010, 1 page.
Civil Action—Case No. CV10-03443—Complaint for Declaratory Judgment, filed on Aug. 6, 2010, with Exhibits A through I, 153 pages.
Civil Action—Case No. CV10-03443—Notice of Voluntary Dismissal Without Prejudice, filed on Aug. 16, 2010, 2 pages.
Civil Action—CV10-03428—Order Reassigning Case. Case reassigned to Judge Hon. Lucy H. Koh for all further proceedings. Judge Magistrate Judge Elizabeth D. Laporte no longer assigned to the case, filed Aug. 16, 2010, 1 page.
Civil Action—CV10-03428—Motion to Dismiss Complaint filed by A10 Networks, Inc., Lee Chen, Rajkumar Jalan, Ron Szeto, filed Oct. 11, 2010, 30 pages.
Civil Action CV10-03428—Defendant, David Cheung's Answer to Plaintiff's First Amended Complaint, filed Nov. 11, 2010, 32 pages.
Civil Action CV10-03428—Notice of Motion and Motion to Dismiss First Amended Complaint filed by A10 Networks, Inc., Lee Chen, Rajkumar Jalan, Ron Szeto, filed Nov. 12, 2010, 34 pages.
Civil Action CV10-03428—Declaration of Scott R. Mosko in Support of Motion to Dismiss First Amended Complaint, filed by A10 Networks, Inc., Lee Chen, Rajkumar Jalan, Ron Szeto, filed Nov. 12, 2010, 56 pages. Included: Exhibits A and B.
Civil Action CV10-03428—Memorandum in Opposition re Motion to Dismiss First Amended Complaint, filed by Brocade Communications Systems, Inc., Foundry Networks, LLC, filed Jan. 27, 2011, 33 pages.
Civil Action CV10-03428—Reply to Opposition re Motion to Dismiss First Amended Complaint, filed by A10 Networks, Inc., Lee Chen, Liang Han, Steve Hwang, Rajkumar Jalan, Ron Szeto, filed Feb. 3, 2011, 20 pages.
Civil Action CV10-03428—Order by Judge Lucy H. Koh granting in part and denying in part Motion to Dismiss First Amended Complaint, filed Mar. 23, 2011, 19 pages.
Civil Action CV10-03428—Motion to Stay Defendants' Motion to Stay Proceedings Pending Reexaminations filed by A10 Networks, Inc., Lee Chen, Liang Han, Steve Hwang, Rajkumar Jalan, Ron Szeto, filed Jul. 1, 2011, 26 pages. Included: Affidavit Declaration of Scott R. Mosko in Support of Motion; Proposed Order, Exhibits 1 and 2.
Civil Action CV10-03428—Opposition to Motion to Stay Proceedings Pending Reexaminations, filed by Brocade Communications Systems, Inc., Foundry Networks, LLC, filed Jul. 15, 2011, 20 pages. Included: Proposed Order.
Civil Action CV10-03428—Declaration of Siddhartha M. Venkatesan in Support of Opposition/Response to Motion, Plaintiffs' Opposition to Defendants' Motion to Stay Proceedings, filed by Brocade Communications Systems, Inc., Foundry Networks, LLC, filed Jul. 15, 2011, 70 pages. Included: Exhibits A through E.
Civil Action CV10-03428—Reply to Plaintiffs' Opposition to Defendants' Motion to Stay Proceedings Pending Reexaminations, filed by A10 Networks, Inc., filed Jul. 22, 2011, 34 pages. Included: Declaration of Scott R. Mosko, Exhibits A, C, and D.
Civil Action CV10-03428—Memorandum in Support of Motion for Temporary Restraining Order and Preliminary Injunction [Redacted Version] filed by Brocade Communications Systems, Inc., Foundry Networks, LLC, filed Jul. 26, 2011, 34 pages. Included: Proposed Order for Temporary Restraining Order and Order to Show Cause and Proposed Preliminary Injunction.
Civil Action CV10-03428—Declaration of Andrew (Andy) Guerrero in Support of Motion for Temporary Restraining Order [Redacted Version] of Plaintiffs' Memorandum in Support of Motion for Temporary Restraining Order and Preliminary Injunction [Redacted Version] of Andrew (Andy) Guerrero ISO Plaintiffs' Motion for TRO and Preliminary Injunction filed by Brocade Communications Systems, Inc., Foundry Networks, LLC, filed Jul. 26, 2011, 3 pages.
Civil Action CV10-03428—Declaration of Fabio E. Marino in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 2 pages.
Civil Action CV10-03428—Declaration of Keith Stewart in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 5 pages.

(56) References Cited

OTHER PUBLICATIONS

Civil Action CV10-03428—Declaration of Mani Prasad Kancherla in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 5 pages.

Civil Action CV10-03428—Declaration of Prasad Aluri in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 3 pages.

Civil Action CV10-03428—Declaration of Robert D. Young in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 46 pages. Included: Redacted Exhibits 1 through 8.

Civil Action CV10-03428—Declaration of Lisa McGill in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 506 pages. Included: Exhibits 1 through 30. (due to size, this references will be submitted in three parts).

Civil Action CV10-03428—Plaintiffs' Reply Memorandum in Further Support of Motion for Temporary Restraining Order and Preliminary Injunction[Redacted Version] filed by Brocade Communications Systems, Inc., Foundry Networks, LLC, filed Aug. 4, 2011, 22 pages.

Civil Action CV10-03428—Notice of Errata re Reply Memorandum in Further Support of Motion for Temporary Restraining Order and Preliminary Injunction, filed by Brocade Communications Systems, Inc., Foundry Networks, LLC, filed Aug. 5, 2011, 2 pages.

Civil Action CV10-03428—Order by Judge Lucy H. Koh denying Motion to Stay; finding as moot Motion to Compel; denying Motion to Qualify Expert Kevin Jeffay Under the Protective Order; granting in part and denying in part Motion for Sanctions; granting Motion to Order A10 to File Confidential Information Under Seal; granting Motion for Leave to File Supplemental Authority, filed Aug. 12, 2011, 2 pages.

Civil Action CV10-03428—Order Denying Motion for Temporary Restraining Order [Redacted Version] of Plaintiffs' Memorandum in Support of Motion for Temporary Restraining Order and Preliminary Injunction, filed by Brocade Communications Systems, Inc., Foundry Networks, LLC, filed Aug. 16, 2011, 5 pages.

Civil Action CV10-03428—Notice of Granted Request for Reexamination of U.S. Pat. No. 7,581,009, filed Sep. 27, 2011, 18 pages.

Civil Action CV10-03428—Redacted Declaration of David Klausner in Support of Opposition to Plaintiffs' Motion for Temporary Restraining Order and Preliminary Injunction, by A10 Networks, Inc., filed Sep. 28, 2011, 9 pages.

Civil Action CV10-03428—Redacted Declaration of Dr. Chi Zhang in Support of Opposition to Plaintiffs' Motion for Temporary Restraining Order and Preliminary Injunction, filed by A10 Networks, Inc., filed Sep. 28, 2011, 4 pages.

Civil Action CV10-03428—Notice of Motion for Partial Summary Judgment on Assignor Estoppel, filed by Brocade Communications Systems, Inc., Foundry Networks, LLC, filed Oct. 11, 2011, 21 pages.

Civil Action CV10-03428—Declaration of Teri H.P. Nguyen in Support of Motion for Partial Summary Judgment Notice of Motion and Motion for Partial Summary Judgment on Assignor Estoppel, filed by Brocade Communications Systems, Inc., Foundry Networks, LLC, filed Oct. 11, 2011, 259 pages. Included: Exhibits A through R.

Civil Action CV10-03428—Initial Claim Construction Brief, filed by Brocade Communications Systems, Inc., Foundry Networks, LLC, filed Oct. 11, 2011, 31 pages.

Civil Action CV10-03428—Declaration of Nitin Gambhir of Brocade Communications Systems, Inc. and Foundry Networks, LLC's Motion for Summary Judgment of Infringement of U.S. Pat. No. 7,454,500; U.S. Pat. No. 7,581,009; U.S. Pat. No. 7,657,629; U.S. Pat. No. 7,584,301; U.S. Pat. No. 7,840,678; U.S. Pat. No. 7,716,370; U.S. Pat. No. 7,647,427; and U.S. Pat. No. 7,558,195 filed by Brocade Communications Systems, Inc., Foundry Networks, LLC., filed Oct. 11, 2011, 251 pages. Included: Exhibits A through H and Proposed Order.

Civil Action CV10-03428—Administrative Motion to File Under Seal Brocade Communications Systems, Inc. and Foundry Networks, LLC's Administrative Motion for Leave to File Under Seal Notice of Errata and Submission of Corrected Brief, filed by Brocade Communications Systems, Inc., Foundry Networks, LLC, filed Oct. 13, 2011, 8 pages. Included: Proposed Order and Declaration.

Civil Action CV10-03428—Order by Judge Lucy H. Koh denying Motion for Leave to File Excess Pages and Striking Plaintiffs' Motion for Summary Judgment on Infringement, filed Oct. 18, 2011, 2 pages.

Civil Action CV10-03428—Declaration of Nitin Gambhir in Support of Brocade Communications, Inc. and Foundry Networks, LLCs Motion for Summary Judgment of Infringement of U.S. Pat. No. 7,454,500; U.S. Pat. No. 7,581,009; U.S. Pat. No. 7,657,629; U.S. Pat. No. 7,584,301; and U.S. Pat. No. 7,840,678, filed by Brocade Communications Systems, Inc., Foundry Networks, LLC, filed Oct. 21, 2011, 162 pages.

Civil Action CV10-03428—Opposition re Motion for Partial Summary Judgment on Assignor Estoppel Defendant and Counterclaimant A10 Networks, Inc.'s, and Defendants Lee Chen's, Rajkumar Jalan's, and Ron Szeto's Opposition to Plaintiffs Brocade Communications Systems, Inc.'s and Foundry Networks, LLC's Motion for Partial Summary Judgment on Assignor Estoppel, filed by A10 Networks, Inc., Lee Chen, Rajkumar Jalan, Ron Szeto, filed Nov. 8, 2011, 17 pages.

Civil Action CV10-03428—Responsive Claim-Construction Brief (PLR 4-5(b)) by A10 Networks, Inc., Lee Chen, Rajkumar Jalan, filed Nov. 15, 2011, 28 pages.

Civil Action CV10-03428—Declaration of Scott R. Mosko in Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed Nov. 15, 2011, 70 pages. Included: Exhibits A through F.

Civil Action CV10-03428—Declaration of J. Douglas Tygar, Ph.D. in Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed on Nov. 15, 2011, 77 pages.

Civil Action CV10-03428—Opposition re Motion for Summary Judgment of Noninfringement of U.S. Pat. No. 5,875,185; Motion for Partial Summary Judgment of U.S. Pat. No. 7,454,500; U.S. Pat. No. 7,581,009; U.S. Pat. No. 7,657,629; U.S. Pat. No. 7,584,301; and U.S. Pat. No. 7,840,678, filed by A10 Networks, Inc., Lee Chen, Rajkumar Jalan, filed Nov. 15, 2011, 20 pages.

Civil Action CV10-03428—Declaration of Scott R. Mosko in Support of Defendant and Counterclaimant A10 Networks, Inc.s, and Defendants Lee Chens and Rajkumar Jalans Opposition to Plaintiffs Brocade Communications, Inc. and Foundry Networks, LLCs Motion for Partial Summary Judgment of U.S. Pat. No. 7,454,500; U.S. Pat. No. 7,581,009; U.S. Pat. No. 7,657,629; U.S. Pat. No. 7,584,301; and U.S. Pat. No. 7,840,678 filed by A10 Networks, Inc., Lee Chen, Rajkumar Jalan, filed Nov. 15, 2011, 16 pages.

Civil Action CV10-03428—Administrative Motion to Consider Whether Cases Should be Related, filed by Brocade Communica-

(56) References Cited

OTHER PUBLICATIONS tions Systems, Inc., Foundry Networks, LLC, filed Nov. 21, 2011, 8 pages. Included: Declaration and Proposed Order.
Civil Action CV10-03428—Reply Claim Construction Brief filed by Brocade Communications Systems, Inc., Foundry Networks, LLC, filed Nov. 22, 2011, 22 pages.
Civil Action CV10-03428—Declaration of Nitin Gambhir in Support of Reply Claim Construction Brief, filed by Brocade Communications Systems, Inc., Foundry Networks, LLC, filed Nov. 22, 2011, 12 pages. Included: Exhibit A.
Civil Action CV10-03428—Motion to Stay Defendant and Counterclaimant A10 Networks, Inc.'s and Defendants Lee Chen's Rajkumar Jalan's, Ron Szeto's and Steve Hwang's Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 15 pages. Included: Proposed Order.
Civil Action CV10-03428—Declaration of Scott A. Herbst Declaration of Scott A. Herbst in Support of Defendant and Counterclaimant A10 Networks, Inc.s and Defendants Lee Chens, Rajkumar Jalans, Ron Szetos, and Steve Hwangs Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 25 pages. Included: Exhibits 1 through 6.
Civil Action CV10-03428—Litigation Docket, printed on Nov. 26, 2011, 2011, 44 pages.
Civil Action CV10-03428—Stipulation Regarding Plaintiffs' Motion for Partial Summary Judgment of Assignor Estoppel, filed Nov. 30, 2011, 2 pages.
Civil Action CV10-03428—Brocade's Opposition to Defendant's Motion to Stay Proceedings Pending Reexaminations, filed Dec. 7, 2011, 18 pages.
Civil Action CV10-03428—Defendant and Counterclaimant A10 Networks, Inc.'s and Defendants Lee Chen's, Rajkumar Jalan's, Ron Szeto's, and Steve Hwang's Reply in Support of its Renewed Motion to Stay Proceedings Pending Inter Partes Reexaminations (All Patents Asserted by Plaintiffs), Filed Dec. 14, 2011, 11 pages.
Civil Action CV10-03428—Defendant and Counterclaimant A10 Networks, Inc.'s Notice of Granted Requests for Inter Partes Reexamination of Plaintiffs' U.S. Pat. No. 7,558,195; U.S. Pat. No. 7,454,500; U.S. Pat. No. 7,574,508; and U.S. Pat. No. 7,720,977, filed Dec. 28, 2011, 3 pages.
Civil Action CV10-03428—Defendant and Counterclaimant A10 Networks, Inc.'s Notice of Granted Request for Inter Partes Reexamination of Plaintiffs' U.S. Pat. No. 7,581,301, filed Dec. 29, 2011, 3 pages.
Civil Action CV10-03428—Defendant and Counterclaimant A10 Networks, Inc.'s Notice of Granted Request for Inter Partes Reexamination of Plaintiffs' U.S. Pat. No. 7,657,629 and U.S. Pat. No. 7,840,678, filed Jan. 20, 2012, 3 pages.
Civil Action CV10-03428—Defendant and Counterclaimant A10 Networks, Inc.'s Notice regarding Inter Partes Reexaminations of Plaintiffs' Asserted Patents: (i) Four Newly-Granted Requests (U.S. Pat. No. 7,774,833; U.S. Pat. No. 7,647,427; U.S. Pat. No. 7,716,370; U.S. Pat. No. 7,581,009); and (ii) Status Updated for Eleven Already-Instituted Reexaminations (U.S. Pat. No. 7,774,833; U.S. Pat. No. 7,647,427; U.S. Pat. No. 7,716,370; U.S. Pat. No. 7,581,009; U.S. Pat. No. 7,657,629; U.S. Pat. No. 7,840,678; U.S. Pat. No. 7,584,301; U.S. Pat. No. 7,558,195; U.S. Pat. No. 7,454,500; U.S. Pat. No. 7,720,977; and U.S. Pat. No. 7,574,508), filed Feb. 6, 2012, 3 pages.
Civil Action CV10-03428—Defendant and Counterclaimant A10 Networks, Inc.'s Notice of Granted Request for Inter Partes Reexamination of Plaintiffs' U.S. Pat. No. 7,756,965 and Status Update, filed Feb. 16, 2012, 3 pages.
Notice of Allowance for U.S. Appl. No. 12/938,232, dated Apr. 7, 2011, 51 pages.
Non-Final Office Action for U.S. Appl. No. 13/101,398, dated Nov. 10, 2011, 58 pages.

Final Office Action for U.S. Appl. No. 13/101,398, dated Jun. 11, 2012, 56 pages.
Non-Final Office Action for U.S. Appl. No. 10/840,496, dated Oct. 18, 2007, 23 pages.
Final Office Action for U.S. Appl. No. 10/840,496, dated Aug. 1, 2008, 14 pages.
Notice of Allowance for U.S. Appl. No. 10/840,496, dated Oct. 15, 2008, 6 pages.
Non-Final Office Action for U.S. Appl. No. 12/353,701, dated Nov. 4, 2009, 22 pages.
Notice of Allowance for U.S. Appl. No. 12/353,701, dated Apr. 9, 2010, 15 pages.
Request for Reexamination of U.S. Pat. No. 7,756,965, filed Jun. 27, 2011, 38 pages.
Notice of Reexamination Request Filing Date and Notice of Assignment of Reexamination Request, mailed Jun. 30, 2011, Reexamination Control No. 90/011,761, 2 pages.
Ex Parte Interview Summary for Reexamination Control No. 90/011,761, mailed Jul. 6, 2011, 3 pages.
Order Granting Request for Reexamination of U.S. Pat. No. 7,756,965, mailed Aug. 19, 2011, Reexamination Control No. 90/011,761, 9 pages.
Office Action for Reexamination Control No. 90/011,761, dated Nov. 18, 2011, 12 pages.
Decision on Petition for Extension of Time in Reexamination (Granted), mailed Jan. 3, 2012, Reexamination Control No. 90/011,761, 3 pages.
Final Office Action with Interview Summary for Reexamination Control No. 90/011,761, dated Mar. 26, 2012, 17 pages.
Advisory Action for Reexamination Control No. 90/011,761, dated Jul. 17, 2012, 11 pages.
Notification of Non-Compliant Appeal Brief, for Reexamination Control No. 90/011,761, mailed on Oct. 24, 2012, 4 pages.
Request for Inter Partes Reexamination for U.S. Pat. No. 7,756,965 B1, filed Nov. 18, 2011, 189 pages.
Notice of Inter Partes Reexamination Request Filing Date and Notice of Assignment of Inter Partes Reexamination Request, mailed Dec. 1, 2011, Reexamination Control No. 95/001,827, 2 pages.
Order Granting Request for Inter Partes Reexamination of U.S. Pat. No. 7,756,965 and Office Action, dated Feb. 13, 2012, Reexamination Control No. 95/001,827, 18 pages.
Decision on Petition for Extension of Time in Reexamination (Granted), mailed Mar. 30, 2012, Reexamination Control No. 95/001,827, 3 pages.
Third Party Requester's Comments under 35 U.S.C. § 314(B)(2) and 37 C.F.R. § 1.947, for Reexamination Control No. 95/001,827, filed Jun. 13, 2012, 40 pages.
Third Party Requester's Refiling of Certificate of Service for Requester Comments, for Reexamination Control No. 95/001,827, filed Jun. 21, 2012, 3 pages.
Third Party Requester's Opposition to Petition to Refuse Entry of Requester's Comments, for Reexamination Control No. 95/001,827, filed Jul. 12, 2012, 5 pages.
Decision Dismissing Petitions, for Reexamination Control No. 95/001,827, mailed Aug. 22, 2012, 5 pages.
Notice of Allowance for U.S. Appl. No. 12/787,779, dated Dec. 20, 2010, 45 pages.
Notice of Allowance for U.S. Appl. No. 12/787,779, dated Jan. 12, 2011, 48 pages.
Request for Reexamination of U.S. Pat. No. 7,899,899, filed Jun. 27, 2011, 24 pages.
Notice of Reexamination Request Filing Date and Notice of Assignment of Reexamination Request, mailed Jul. 8, 2011, Reexamination Control No. 90/011,760, 2 pages.
Ex Parte Interview Summary for Reexamination Control No. 90/011,760, mailed Jul. 18, 2011, 3 pages.
Order Granting Request for Reexamination of U.S. Pat. No. 7,899,899, mailed Aug. 19, 2011, Reexamination Control No. 90/011,760, 9 pages.
Office Action for Reexamination Control No. 90/011,760, dated Nov. 18, 2011, 8 pages.

(56) References Cited

OTHER PUBLICATIONS

Decision on Petition for Extension of Time in Reexamination (Granted), mailed Jan. 5, 2012, Reexamination Control No. 90/011,760, 3 pages.
Final Office Action and Interview Summary for Reexamination Control No. 90/011,760, dated Mar. 21, 2012, 14 pages.
Advisory Action for Reexamination Control No. 90/011,760, dated Jul. 17, 2012, 10 pages.
Request for Inter Partes Reexamination for U.S. Pat. No. 7,899,899 B1, filed Nov. 18, 2011, 153 pages.
Notice of Inter Partes Reexamination Request Filing Date and Notice of Assignment of Inter Partes Reexamination Request, mailed Nov. 29, 2011, Reexamination Control No. 95/001,826, 2 pages.
Order Granting Request for Inter Partes Reexamination of U.S. Pat. No. 7,899,899 and Office Action for Reexamination Control No. 95/001,826, dated Feb. 7, 2012, 19 pages.
Decision on Petition for Extension of Time in Reexamination (Granted), mailed Apr. 4, 2012, Reexamination Control No. 95/001,826, 3 pages.
Third Party Requester's Comments under 35 U.S.C. § 314(B)(2) and 37 C.F.R. § 1.947, for Reexamination Control No. 95/001,826, filed Jun. 6, 2012, 46 pages.
Third Party Requester's Refiling of Certificate of Service for Requester Comments, for Reexamination Control No. 95/001,826, filed Jun. 21, 2012, 3 pages.
Third Party Requester's Opposition to Petition to Refuse Entry of Requester's Comments, for Reexamination Control No. 95/001,826, filed Jul. 12, 2012, 5 pages.
Decision Dismissing Petitions, for Reexamination Control No. 95/001,826, mailed Aug. 22, 2012, 5 pages.
Non-Final Office Action for U.S. Appl. No. 13/023,292, dated Jul. 8, 2011, 6 pages.
Notice of Allowance for U.S. Appl. No. 13/023,292, dated Feb. 13, 2012, 85 pages.
Office Communication for U.S. Appl. No. 13/023,292 dated Feb. 23, 2012, 11 pages.
Notice of Allowance for U.S. Appl. No. 13/023,292, dated May 18, 2012, 25 pages.
Notice of Allowance for U.S. Appl. No. 13/023,292, dated Jun. 4, 2012, 22 pages.
Office Communication for U.S. Appl. No. 13/023,292, dated Jul. 2, 2012, 7 pages.
Office Communication for U.S. Appl. No. 13/023,292, dated Aug. 24, 2012, 8 pages.
Non-Final Office Action for U.S. Appl. No. 13/595,952, dated Nov. 13, 2012, 121 pages.
Non-Final Office Action for U.S. Appl. No. 10/924,552, dated Feb. 27, 2008, 14 pages.
Notice of Allowance for U.S. Appl. No. 10/924,552, dated May 30, 2008, 18 pages.
Non-Final Office Action for U.S. Appl. No. 12/177,021, dated Jan. 29, 2010, 8 pages.
Final Office Action for U.S. Appl. No. 12/177,021, dated Aug. 12, 2010, 20 pages.
Notice of Allowance for U.S. Appl. No. 12/177,021, dated Dec. 10, 2010, 20 pages.
Non-Final Office Action for U.S. Appl. No. 13/008,321, dated Nov. 20, 2012, 95 pages.
Non-Final Office Action for U.S. Appl. No. 12/916,390, dated Jul. 30, 2012, 45 pages.
Civil Action CV10-03428, Expert Report of J. Douglas Tygar in Support of Defendant and Counterclaimant A10 Networks, Inc.'s, and Defendant Lee Chen's and Rajkumar Jalan's Invalidity Contentions, filed Mar. 23, 2012, 81 pages.
Civil Action CV10-03428, Transcript of the Deposition of Kevin Delgadillo, taken Mar. 14, 2012, 12 pages.
Delgadillo, K., "Cisco DistributedDirector," posted Apr. 12, 1999, submitted as Exhibit 2 in *Brocade Communications Systems, Inc. v. A10 Networks, Inc.*, Civil Action CV10-03428, Mar. 21, 2012, 27 pages.
Delgadillo, K., "Cisco DistributedDirector," 1999, submitted as Exhibit 3 in *Brocade Communications Systems, Inc. v. A10 Networks, Inc.*, Civil Action CV10-03428, Mar. 21, 2012, 20 pages.
Declaration of James E. Mrose, entered as Exhibit Q in *Brocade Communications Systems, Inc. v. A10 Networks, Inc.*, Civil Action CV10-03428, Mar. 21, 2012, 4 pages.
Information Disclosure Statement, filed Jul. 27, 1999 in the prosecution of U.S. Appl. No. 09/294,837, submitted as Exhibit A to the Mrose Declaration, 7 pages.
S. Ariyapperuma et al., "Security Vulnerabilities in DNS and DNSSEC," Second International Conference on Availability, Reliability and Security (ARES '07), Apr. 2007, 8 pages.
Cisco Systems, Inc., "Configuring a DRP Server Agent," Jul. 6, 1999 (updated Oct. 11, 2006), 20 pages.
Bourke, Tony, "Server Load Balancing", Server Load Balancing, 2001, O'Reilly & Associates, Inc., Published by O'Reilly & Associates Inc., 101 Morris Street, Sebastopol CA 95472, Printed Aug. 2001, First Edition, 182 pages.
Hasenstein, Michael, "IP Address Translation", http://www.csn.tu-chemnitz.de/HyperNews/get/linux-ip-nat.html, 1997, 50 pages.
Hasenstein, Michael, "Linux IP Network Address Translation", http://web.archive.org/web/20031209024748/http://www.hasenstein.com/HyperNews/get/linux-tp-nat.html, Dec. 2003, 12 pages.
Zhou, Tao, "Web Server Load Balancers", http://windowsitpro.com/print/networking/web-server-load-balancers, Feb. 29, 2000, 7 pages.
Office Action dated Feb. 18, 2015, issued in U.S. Appl. No. 10/305,823.
Notice of Allowance dated Mar. 2, 2015, issued in U.S. Appl. No. 12/635,371.
Office Action dated May 13, 2015, issued in U.S. Appl. No. 10/305,823.
Notice of Allowance dated Jun. 26, 2015, issued in U.S. Appl. No. 10/305,823.

\* cited by examiner

CANONICAL NAME (CNAME) HANDLING FOR GLOBAL SERVER LOAD BALANCING

CROSS REFERENCE TO RELATED APPLICATION

The present application is a continuation that claims the benefit under 35 U.S.C. § 120 to U.S. patent application Ser. No. 10/214,921, entitled "CANONICAL NAME (CNAME) HANDLING FOR GLOBAL SERVER LOAD BALANCING," filed Aug. 7, 2002, assigned to the same assignee as the present application, and which is incorporated herein by reference in its entirety.

BACKGROUND OF THE INVENTION

Field of the Invention

The disclosure invention relates generally to load balancing among servers. More particularly but not exclusively, the present disclosure relates to handling of canonical names (CNAMEs) in load balancing systems that provide the address of a server expected to serve the client with a high performance in a given application.

Description of the Related Art

Under the TCP/IP protocol, when a client provides a symbolic name ("URL") to request access to an application program or another type of resource, the host name portion of the URL needs to be resolved into an IP address of a server for that application program or resource. For example, the URL (e.g., http://www.foundrynet.com/index.htm) includes a host name portion www.foundrynet.com that needs to be resolved into an IP address. The host name portion is first provided by the client to a local name resolver, which then queries a local DNS server to obtain a corresponding IP address. If a corresponding IP address is not locally cached at the time of the query, or if the "time-to-live" (TTL) of a corresponding IP address cached locally has expired, the DNS server then acts as a resolver and dispatches a recursive query to another DNS server. This process is repeated until an authoritative DNS server for the domain (e.g., foundrynet.com, in this example) is reached. The authoritative DNS server returns one or more IP addresses, each corresponding to an address at which a server hosting the application ("host server") under the host name can be reached. These IP addresses are propagated back via the local DNS server to the original resolver. The application at the client then uses one of the IP addresses to establish a TCP connection with the corresponding host server. Each DNS server caches the list of IP addresses received from the authoritative DNS for responding to future queries regarding the same host name, until the TTL of the IP addresses expires.

To provide some load sharing among the host servers, many authoritative DNS servers use a simple round-robin algorithm to rotate the IP addresses in a list of responsive IP addresses, so as to distribute equally the requests for access among the host servers.

The conventional method described above for resolving a host name to its IP addresses has several shortcomings. First, the authoritative DNS does not detect a server that is down. Consequently, the authoritative DNS server continues to return a disabled host server's IP address until an external agent updates the authoritative DNS server's resource records. Second, when providing its list of IP addresses, the authoritative DNS sever does not take into consideration the host servers' locations relative to the client. The geographical distance between the server and a client is a factor affecting the response time for the client's access to the host server. For example, traffic conditions being equal, a client from Japan could receive better response time from a host server in Japan than from a host server in New York. Further, the conventional DNS algorithm allows invalid IP addresses (e.g., that corresponding to a downed server) to persist in a local DNS server until the TTL for the invalid IP address expires.

One technique to address these shortcomings is a global server load balancing system provided by Foundry Networks, Inc. of Santa Clara, Calif. As one example, Foundry provides the ServerIron product to add intelligence to authoritative DNS servers by serving as a proxy to these servers. The ServerIron has a global server load balancing (GSLB) feature that intelligently uses health-checks and other methods to assess the availability and responsiveness of the host sites in the DNS reply. When necessary, the ServerIron exchanges the IP address at the top of the address list returned by the authoritative DNS with another IP address selected from the list, based on a set of performance metrics indicative of which particular host server may provide the optimum access. Thus, the GSLB feature ensures that a client always receives a DNS reply for a host site that is available and is the best choice among the available hosts. Example embodiments for global server load balancing are disclosed in U.S. application Ser. No. 09/670,487, entitled "GLOBAL SERVER LOAD BALANCING," filed Sep. 26, 2000, assigned to the same assignee as the present application, and which is incorporated herein by reference its entirety.

Canonical names (CNAMEs) are one of the different types of DNS resource records that reside on the authoritative DNS server. A CNAME is used to indicate that the resource record is an alias for another address record (or "A record") on the authoritative DNS server. That is, a CNAME refers to (e.g., maps to) another domain name (A record) instead of mapping to an IP address. When the authoritative DNS server looks up a name and finds a CNAME record, it replaces the name with the canonical name and looks up the new name. Typically, on the authoritative DNS server, there is one or more CNAME records pointing to an address record, which in turn points to one or more IP addresses. For example, the authoritative DNS server can have the A record www.foundrynet.com and the CNAME records www1.foundrynet.com, www2.foundrynet.com, www3.foundrynet.com, all pointing to the A record www.foundrynet.com. Thus, while there may be potentially hundreds to thousands of aliases/CNAMEs associated with a particular domain name, they nevertheless "share" the same IP addresses since the CNAMEs map to a common A record corresponding to the IP addresses.

In one GSLB implementation, when an authoritative DNS server resolves a host name portion in a query and returns one or more IP addresses, the GSLB switch (such as a ServerIron configured for GSLB in a manner described above) applies the GSLB algorithm to the IP address list and returns a ranked list of IP addresses to the inquirer, provided the respective host name is configured on the GSLB switch. If a host name is not configured for GSLB, the GSLB switch does not apply the GSLB algorithm on DNS replies (received from the authoritative DNS server) pertaining to that host name. This behavior provides flexibility to a system administrator, to selectively load-balance only the required domains and hosts. However, for systems that have huge lists of CNAME records on their DNS servers and that wish to use GSLB to load balance all of these hosts, configuration of each and every one of the hosts on the GSLB switch is needed. This creates a significant amount of configuration overhead for systems that have large numbers of CNAMEs.

BRIEF SUMMARY OF THE INVENTION

One aspect of the present invention provides a method for a load balancing system. The method includes receiving a communication regarding a domain name. The communication is checked to detect a canonical name (CNAME). If the CNAME is detected, a server load balancing algorithm is applied to a list of network addresses associated with the communication.

DETAILED DESCRIPTION

Embodiments of canonical name (CNAME) handling (or other CNAME processing) in the context of load balancing among servers are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment of the invention provides a method for CNAME handling in a system configured for global server load balancing (GSLB), which orders IP addresses into a list based on a set of performance metrics. An automatic CNAME detection feature is provided that reduces (or eliminates) the need to configure each and every one of the CNAMES in a GSLB switch, thereby providing relief from the significant configuration overhead.

According to the operation of one embodiment, the CNAME detection feature is disabled by default, and can be turned on globally for all relevant zones eligible for GSLB. Once the CNAME detection feature is enabled in a GSLB switch, when the GSLB switch receives a DNS reply from an authoritative DNS server, the GSLB switch scans the DNS reply for CNAME records. If there is a CNAME record identified in the DNS reply and it points to a host name that is configured for GSLB, the GSLB switch applies a GSLB algorithm on the reply. In an embodiment, this involves identifying the host name (pointed to by the CNAME record) in the reply and applying a set of performance metrics to the list of returned IP addresses corresponding to that host name, to place the "best" or optimum IP address at the top of the list before sending the list to the inquiring client. If the CNAME record in the reply points to a host name that is not configured for GSLB, the GSLB sends the reply unaltered (e.g., does not apply the GSLB algorithm to the reply) to the inquiring client, since the host name was not intended to be subject to GSLB by the system administrator.

Figure 1:
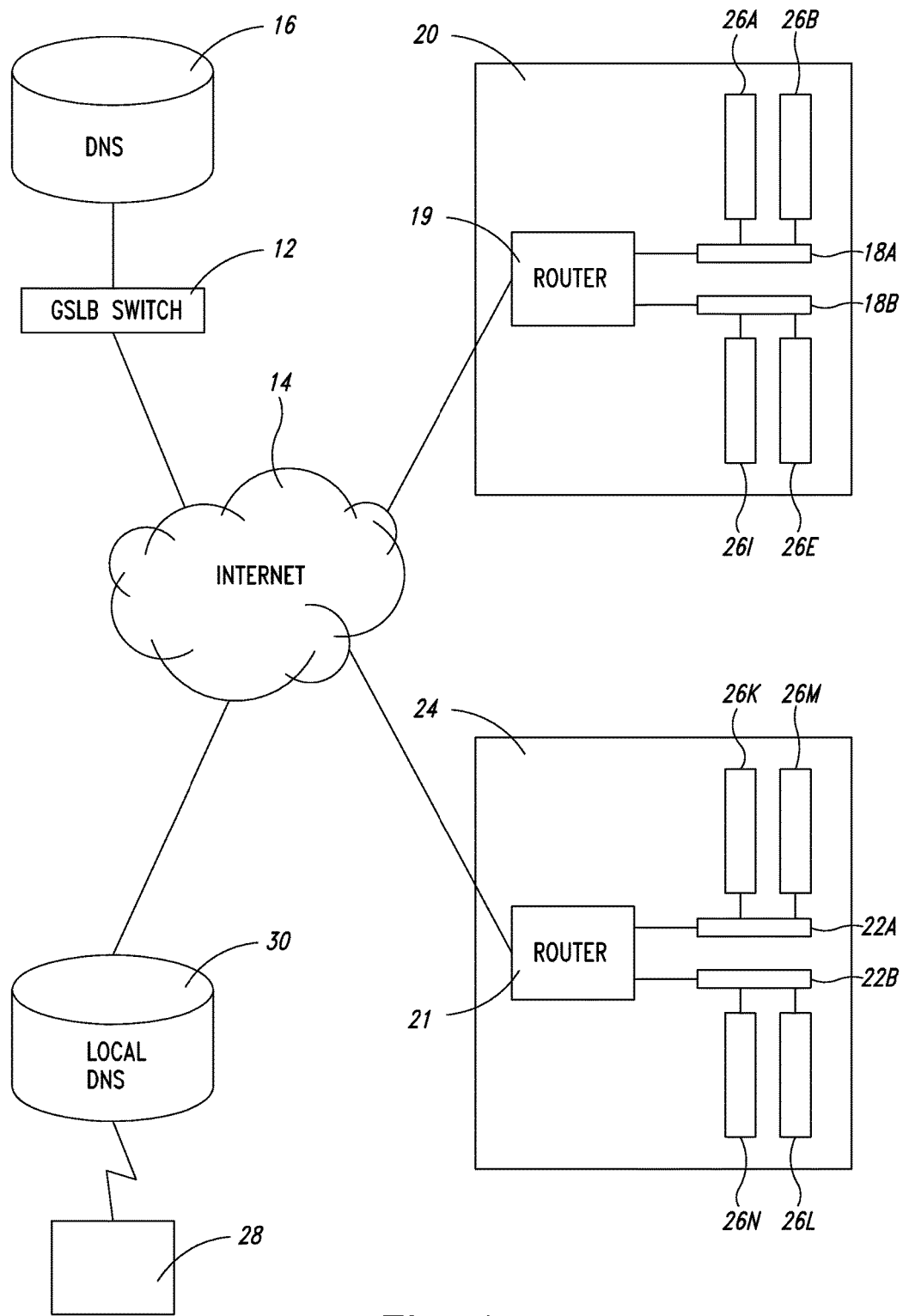
FIG. 1 illustrates a global server load-balancing configuration with which one embodiment of the invention may be implemented.

FIG. 1 illustrates one example global server load-balancing configuration with which an embodiment of the invention may be used. As shown in FIG. 1, GSLB switch 12 is connected to Internet 14 and acts as a proxy to an authoritative Domain Name System (DNS) server 16 for the domain "foundrynet.com" (for example). That is, while the actual DNS service is provided by DNS server 16, the IP address known to the rest of the Internet 14 for the authoritative DNS server of the domain "foundrynet.com" is a virtual IP (VIP) address configured on GSLB switch 12. Of course, DNS server 16 can also act simultaneously as an authoritative DNS for other domains. GSLB switch 12 communicates, via Internet 14, with site switches 18A and 18B at site 20, site switches 22A and 22B at site 24, and any other similarly configured site switches. Site switch 18A, 18B, 22A and 22B are shown, for example, connected to routers 19 and 21 respectively and to servers 26A, ..., 26I, ... 26N. Some or all of servers 26A, ..., 26I, ..., 26N may host application server programs (e.g., http and ftp) relevant to the present invention. These host servers are reached through site switches 18A, 18B, 22A and 22B using one or more virtual IP addresses configured at the site switches, which act as proxies to the host servers. A suitable switch for implementing either GSLB switch 12 or any of site switches 18A, 18B, 22A and 22B is the "ServerIron" product available from Foundry Networks, Inc.

FIG. 1 also shows client program 28 connected to Internet 14, and communicates with local DNS server 30. When a browser on client 28 requests a web page, for example, using a Universal Resource Locator (URL), such as http://www-.foundrynet.com/index.htm, a query is sent to local DNS server 30 to resolve the symbolic host name www.foundrynet.com to an IP address of a host server. The client program receives from DNS server 30 a list of IP addresses corresponding to the resolved host name. This list of IP addresses is either retrieved from local DNS server 30's cache, if the TTL of the responsive IP addresses in the cache has not expired, or obtained from GSLB switch 12, as a result of a recursive query. Unlike the prior art, however, this list of IP addresses is ordered by GSLB switch 12, provided that the host name www.foundrynet.com is configured on GSLB switch 12, based on performance metrics, as described in further detail in U.S. application Ser. No. 09/670,487 referenced above, and in U.S. application Ser. No. 10/206,580, entitled "GLOBAL SERVER LOAD BALANCING," filed Jul. 25, 2002, with inventors Sunanda L. Kommula et al., and assigned to the same assignee as the present application (and disclosing embodiments of a connection-load metric for GSLB). For the sake of brevity, these various performance metrics and the manner in which they are used in a GSLB algorithm to identify best sites in a list of IP addresses are summarized and not described in detail herein. Such additional details may be found in these co-pending applications.

For purposes of illustration, it is assumed that there may be one or more CNAME or alias records at the authoritative DNS server 16, with such CNAME records pointing to the host name that has been configured for GSLB in the GSLB switch 12. For example, there may be CNAME records www1.foundrynet.com, www2.foundrynet.com, and www3.foundrynet.com that all point to the A record www-.foundrynet.com, which in turn corresponds to one or more IP addresses. In this example, the CNAME records and the A record share a common domain name or zone (e.g., foundrynet.com) but have different hosts (e.g., www, www1, www2, and www3).

A user at the client 28 may enter www1.foundrynet.com in his browser, for instance if the www1 host is what is made available to his geographical area, and then receive IP addresses corresponding to the A record www.foundrynet.com to which the CNAME www1.foundrynet.com maps. It is appreciated that other formats for CNAME records may be used in accordance with an embodiment of the invention. For example, there may be CNAME records having the formats www.foundrynetworks.com, www.foundrynet.org, www17.foundrynetworks.com, or others that all map to the A record www.foundrynet.com. In another implementation, CNAME records may map to ftp.foundrynet.com (for ftp applications). For the sake of brevity, the various techniques that may be suitable to create CNAME records in the authoritative DNS server 16, configure a system to operate with CNAME records, return CNAME records pointing to an A record as part of a DNS reply, and other CNAME implementations are not described in further detail herein because such techniques would be familiar to those skilled in the art having the benefit of this disclosure. Rather, the focus of this disclosure will be on detection and processing of CNAMES in conjunction with GSLB.

In the remainder of this detailed description, for the purpose of illustrating embodiments of the present invention only, the list of IP addresses returned are assumed to be the virtual IP addresses configured on the proxy servers at switches 18A, 18B, 22A and 22B (sites 20 and 24). In one embodiment when the authoritative DNS server 16 resolves a host name in a query and returns one or more IP addresses, the GSLB switch 12 determines (using the performance metrics) which site switch would provide the best expected performance (e.g., response time) for client 28 and returns the IP address list with a virtual IP address configured at that site switch placed at the top. (Other forms of ranking or weighting the IP addresses in the list can also be possible.) Client program 28 can receive the ordered list of IP addresses, and typically selects the first IP address on the list to access the corresponding host server.

Figure 3:
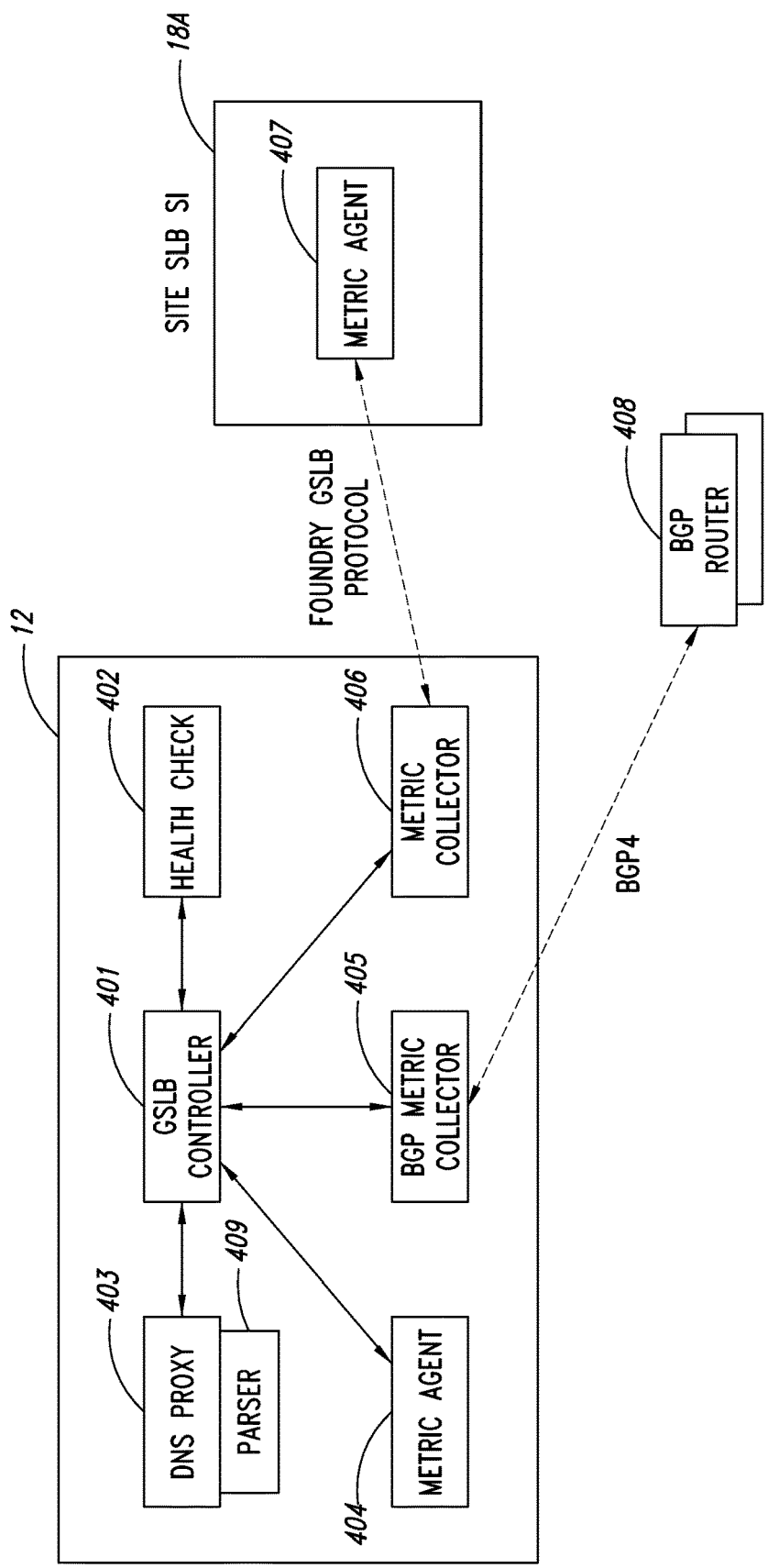
FIG. 3 is a block diagram showing the functional modules of a GSLB switch and a site switch relevant to CNAME handling for global server load balancing in accordance with one embodiment of the invention.

FIG. 3 is a block diagram showing the functional modules of GSLB switch 12 and site switch 18A (for instance) relevant to CNAME handing for the global server load balancing function in one embodiment. As shown in FIG. 3, GSLB switch 12 includes a GSLB switch controller 401, health check module 402, DNS proxy module 403, metric agent 404, routing metric collector 405, and site-specific metric collector 406. GSLB switch controller 401 provides general control functions for the operation of GSLB switch 12. Health check module 402 is responsible for querying, either periodically or on demand, host servers and relevant applications hosted on the host servers to determine the "health" (e.g., whether or not it is available) of each host server and each relevant application. Site-specific metric collector 406 communicates with metric agents in site-specific switches (e.g., FIG. 3 shows site-specific metric collector 406 communicating with site-specific metric agent 407 of a site server load balancing ServerIron or "SLB SI") to collect site-specific metrics (e.g., number of available sessions on a specific host server and/or connection-load data indicative of connections-per-second at that host server).

Routing metric collector 405 collects routing information from routers (e.g., topological distances between nodes on the Internet). FIG. 3 shows, for example, router 408 providing routing metric collector 405 with routing metrics (e.g., topological distance between the load balancing switch and the router), using the Border Gateway Protocol (BGP). DNS proxy module 403 (A) receives incoming DNS requests, (B) provides the host names to be resolved to DNS server 16, (C) receives from DNS server 16 a list of responsive IP addresses, (D) orders the IP addresses on the list received from DNS server 16 according to an embodiment of the present invention, using the metrics collected by routing-metric collector 405 and site specific collector 406, and values of any other relevant parameter, and (E) provides the ordered list of IP addresses to the requesting DNS server. Since GSLB switch 12 can also act as a site switch, GSLB switch 12 is provided site-specific metric agent 404 for collecting metrics for a site-specific metric collector.

One embodiment of the present invention provides a method to detect CNAME records from a DNS reply received from the authoritative DNS server 16. In an embodiment of the invention, this detection can be performed by the DNS proxy module 403 in cooperation with the switch controller 401 as needed. For example, since the DNS proxy module 403 is the component that receives incoming DNS replies from the authoritative DNS server 16, the DNS proxy module 403 can include or otherwise use a parser 409 (or other software component) to scan and identify (from the received DNS reply) a CNAME record, if any is present.

If a CNAME record is detected in the DNS reply, the CNAME record will typically point to or otherwise identify the A record (or host name) to which it maps, as is conventionally found in replies involving CNAME records. The DNS reply will also contain the list of IP addresses that corresponds to the A record and which is used by the CNAME record. If the host name for that A record has been configured for GSLB, then the GSLB switch 12 applies a GSLB algorithm to the list of IP addresses to reorder the list to identify the "best" IP address, and sends the reordered list to the client program 28.

If there is no CNAME record detected in the DNS reply, then the GSLB switch 12 applies the GSLB algorithm to the IP addresses for the A record in the reply, if the host name has been configured for GSLB. Otherwise if there is no CNAME record in the DNS reply and the host name specified in the DNS reply has not been configured for GSLB, then the GSLB algorithm is not applied to the list of IP addresses and is passed unaltered to the client program 28. In another situation, there may be a CNAME record in the GSLB reply but the A record (host name) that it points to has not been configured for GSLB. In this case, the GSLB algorithm is not applied to the list of IP addresses, and the list of IP addresses is sent to the client program 28 unaltered.

Figure 2:
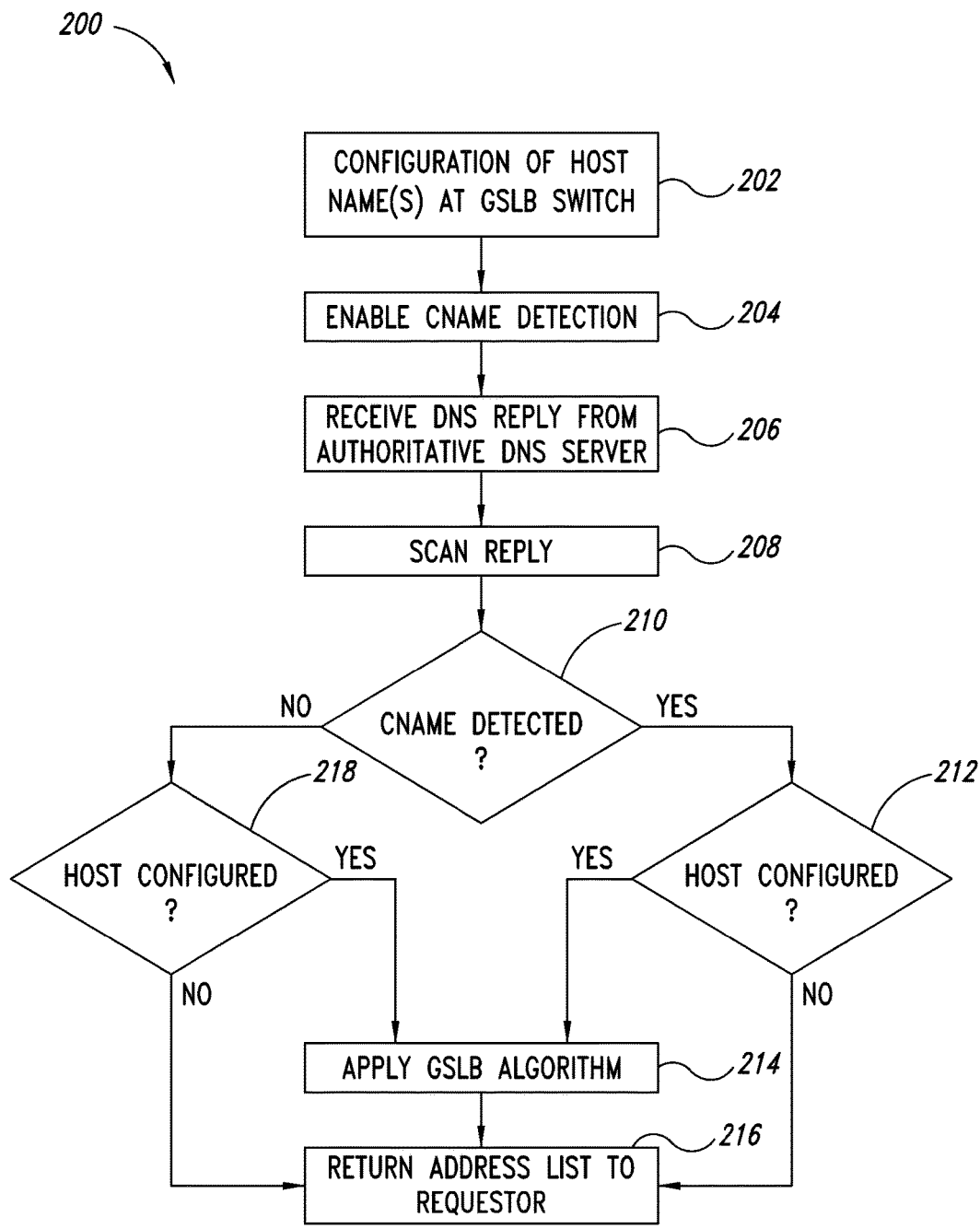
FIG. 2 illustrates in a flow chart one embodiment of a method for CNAME handling related to global server load balancing.

For example, FIG. 2 illustrates in a flow chart 200 one embodiment of a method for CNAME handling related to global server load balancing. At least some of the elements of the flowchart 200 may be embodied in software or other machine-readable instructions stored on one or more machine-readable media. Such machine-readable media may be at the GSLB switch 12 and work in conjunction with the various components illustrated for the GSLB switch 12 in FIG. 3.

Beginning first at a block 202, the host name(s) corresponding to one or more A records are configured at the GSLB switch 12. This configuration can include, for instance, identifying which host names are to be load balanced (e.g., have the GSLB algorithm applied to its IP address list). If a certain host name(s) is not configured for GSLB at the block 202, then the GSLB algorithm will not be applied to its list of IP addresses, and the list is sent unaltered to the requester, such as the client program 28. Therefore, this configuration capability gives a system administrator the flexibility to selectively load balance only certain domains and hosts.

Other configuration operations that can be performed at the block 202 can include enabling of the performance metrics, arranging the order in which the performance metrics are to be performed, correlating the performance metrics to the relevant host names or host servers, and so forth. The details of these configuration operations are not within the scope of this disclosure, and therefore will not be described further. Examples of such configuration details may be found in the technical documentation available at the web site www.foundrynet.com.

At a block 204, the CNAME detection feature is enabled at the GSLB switch 204. This enabling may be performed by the system administrator using a command line interface (CLI) command, as one example. By default, the CNAME detection feature is disabled.

The CNAME detection feature can be enabled to detect CNAMES having different hosts but zones in common with the A record. Examples are the www1.foundrynet.com, www2.foundrynet.com, and www3.foundrynet.com CNAME records that all point to the A record www.foundrynet.com. In other embodiments, the CNAME detection feature can be enabled to detect CNAMES with the same hosts but slightly different domain name designations, such as www.foundrynetworks.com, www.foundrynet.org, and others. Detection of other CNAME variations (or combination of variations) is also possible.

In some implementations, the DNS replies received from the authoritative DNS server 16 will include in it the CNAME record, the actual host name (A record) that it points to, and the list of IP addresses corresponding to the actual host name. Therefore, no additional configuration need be performed at the GSLB switch 12 to correlate (such as via a lookup table) CNAMEs to an actual host name.

In implementations where only the CNAME and the list of IP addresses is included in the DNS reply received from the authoritative DNS server 16 (e.g., the actual host name cannot be determined directly from the DNS reply), configuration and population of a lookup table or other correlation mechanism at the GSLB switch 12 is performed so that the CNAME and/or IP addresses in the received DNS replies can be matched to an actual host name, for determination of whether that host name is configured for GSLB.

In yet other implementations, the DNS reply may only include the CNAME and a pointer to an external list of IP addresses and/or host names. In such cases, suitable correlation (such as via a lookup table) can be performed to locate the IP addresses and/or host names in order to perform the CNAME-handling processes described herein.

After enablement of the CNAME detection feature at the block 204, the GSLB switch 12 can receive DNS replies from the authoritative DNS server (or receive other communications for which CNAME handling may be applied, including a query that may specify a CNAME) at a block 206. The DNS reply will generally have a list of IP addresses corresponding to the actual host name. For situations that do not involve CNAMES, the DNS reply generally will have the IP addresses (and the actual host name). For situations that involve CNAMES, the DNS reply will have in it the CNAME, the IP addresses of the actual host name, and perhaps the actual host name itself.

As each DNS reply is received at the block 206 by the DNS proxy module 403, the parser 409 checks or scans through the DNS reply to detect CNAME records at a block 208. A record may be identified as being a CNAME record, for example, if within the DNS reply that record points to another address record. Alternatively or in addition, the address record(s) in the DNS reply may be compared with address records kept in a lookup table at the GSLB switch 12 to determine if the address record in the DNS reply pertains to a CNAME or an actual host name. It is appreciated that other CNAME detection techniques that would be familiar to a person skilled in the art having the benefit of this disclosure may be used.

If a CNAME record is detected at a block 210, then a determination is made at a block 212 as to whether the host name that it points to has been configured for GSLB. If the host name is determined to be configured for GSLB, then the GSLB algorithm is applied at a block 214 to the IP address list returned from the authoritative DNS server 16. The resulting reordered IP address list is then returned to the requestor (such as the client program 28 and/or the local DNS 30) at a block 216.

If at the block 212, however, it is determined that the host name is not configured for GSLB, then the GSLB algorithm is not applied to the IP address list. The IP address list is sent unaltered to the requester at the block 216.

Back at the block 210, if no CNAME is detected in the DNS reply, then it need only be determined whether the actual host name corresponding to the IP address list in the DNS reply is configured for GSLB. This determination is performed at a block 218 (or 212), and involves checking the configuration settings made at the block 202 to confirm whether that actual host name is configured for GSLB.

If the actual host name is configured for GSLB, then the GSLB algorithm is applied to the IP address list at the block 214. Otherwise, the IP address list is returned unaltered to the requester at the block 216.

With regards to the metrics that are applicable to the CNAME handling operations described above, the metrics used for the GSLB algorithm in the GSLB switch 12 in one embodiment include (a) the health of each host server and selected applications, (b) each site switch's session capacity threshold, (c) the round trip time (RTT) between a site switch and a client in a previous access, (d) the geographical location of a host server, (e) the connection-load measure of new connections-per-second at a site switch, (f) the current available session capacity in each site switch, (g) the "flashback" speed between each site switch and the GSLB switch (i.e., how quickly each site switch responds to a health check from the GSLB switch), and (h) a policy called the "Least Response Selection" (LRS) which prefers the site least selected previously. Many of these performance metrics can be provided default values. Each individual metric can be used in any order, such as an order of (a) through (h) identified above, and each metric can be disabled if desired. In one embodiment, the LRS metric is always enabled.

To briefly describe herein one embodiment of a GSLB algorithm (embodiments of which are described in further detail in the co-pending applications previously identified), assume for purposes of illustration that the metric order is (a) through (h) as identified above. Upon receiving the IP address list from the authoritative DNS server 16, GSLB switch 12 performs, for each IP address on the IP address list (e.g., host server 26I connected to site switch 18B), a layer 4 health check and a layer 7 check. Such a health check can be achieved, for example, by a "ping-like" operation defined under the relevant protocol, such as sending SYN/ACK packets under the TCP protocol. If a host server or an associated application fails any of the health checks it is disqualified from being the "best" site and may be excluded from the IP address list to be returned to client program 28.

If the resulting list of IP addresses has only one IP address, then the list of IP addresses is returned to client program 28. Otherwise if there are multiple IP addresses remaining, the IP address list is assessed under the next metric in the algorithm, which is the "capacity threshold" of the site switch serving that IP address. The virtual IP address configured at site switch 18B, for example, may be disqualified from being the "best" IP address if the number of sessions for switch 18B exceed a predetermined threshold percentage (e.g., 90%) of the maximum number of sessions that the site switch can serve. If the resulting list of IP addresses has only one IP address, then list of IP addresses is returned to client program 28.

If, however, the IP address list has multiple IP addresses, the remaining IP addresses on the list can then be reordered based upon a round-trip time (RTT) between the site switch for the IP address (e.g., site switch 18B) and the client (e.g., client 28). The RTT is computed (and stored), for instance, for the interval between the time when a client machine requests a TCP connection to a proxy server configured on a site switch, sending the proxy server a TCP SYN packet, and the time a site switch receives from the client program a TCP ACK packet. Again, if the top entries on the list of IP addresses do not have equal RTTs, the list of IP addresses is returned to client program 28.

If multiple sites have equal RTTs, then the list is reordered based upon the next metric in the GSLB algorithm, which is based on the location (geography) of the host server. The GSLB switch prefers an IP address that is in the same geographical region as the client machine in an embodiment. If the top two entries on the IP list are not equally ranked, the IP list is sent to the client program 28.

After using the geographic metric, if multiple sites are of equal rank for the best site, the IP addresses can then be reordered based upon site connection load. The connection-load metric feature allows comparison of sites based on the connection-load on their respective agent (e.g., at the metric agent 407 of the site ServerIron switch 18A in FIG. 3, for instance). The connection-load is a measure of new connections-per-second on the agent 407 in one embodiment. If a calculated average load is less than a specified load limit, the site is passed on to the next stage of the GSLB algorithm—otherwise that site is eliminated/rejected from the set of potential candidates.

If there are no multiple candidates at the top of the IP list that have passed the connection-load metric (or there are none of equal rank), then the IP address list is sent to the client program 28. If multiple sites are of equal rank for the best site, the IP addresses can then be reordered based upon available session capacity, which is the next metric in the GSLB algorithm. For example in one embodiment, if switch 18A has 1,000,000 sessions available and switch 22B has 800,000 sessions available, switch 18A is then preferred, if a tolerance limit, representing the difference in sessions available expressed as a percentage of capacity in the larger switch, is exceeded. If an IP address is preferred, the IP address will be placed at the top of the IP address list, and is then returned to the requesting entity. Otherwise, if the session capacity does not resolve the best IP address, then resolution is based upon a "flashback" speed. The flashback speed is a time required for a site switch to respond to layers 4 and 7 health checks by the GSLB switch in one embodiment. The preferred IP address will correspond to a flashback speed exceeding the next one by a preset tolerance limit.

If a best IP address is resolved, the IP address list is sent to client program 28. Otherwise, an IP address in the site that is least often selected to be the "best" site (e.g., the LRS metric) is chosen. The IP address list is then sent to client program 28. Upon receipt of the IP address list, the client program 28 uses the best IP address selected (i.e., the top of the list) to establish a TCP connection with a host server.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of providing load balancing in a network, the method comprising:
   receiving, by a processor, a domain name system (DNS) reply to a DNS request to resolve an alias host name that is an alias for a primary domain, wherein the DNS reply includes
   a canonical name (CNAME) record identifying the primary domain, and
   network addresses that correspond with the primary domain;
   detecting, by said processor, the CNAME record identifying the primary domain in said DNS reply;
   applying, by said processor a load balancing algorithm configured to be applied to DNS requests for the primary domain to the network addresses received in response to the DNS request to resolve the alias host name; and
   sending, by said processor, to a client program that originated the DNS request to resolve the alias host name, a response to the DNS request that includes a list of the network addresses associated with the primary domain that has been ordered according to the load balancing algorithm configured to be applied to DNS requests for the primary domain.

2. The method of claim 1 wherein the list of network addresses provided in the DNS reply includes virtual IP addresses.

3. The method of claim 1 wherein said applying the load balancing algorithm comprises arranging, by said processor, the network addresses in said list based on a set of performance metrics.

4. An article of manufacture, comprising:
a non-transitory storage medium having instructions stored thereon that are executable by a computing device to:
receive, by said computing device, a domain name system (DNS) reply for an alias associated with a canonical name (CNAME) record, wherein the alias is for a primary domain;
detect, by said computing device, the CNAME record in said DNS reply identifying the primary domain; and
apply, by said computing device a load balancing algorithm configured to be applied to DNS requests for the primary domain, to a list of one or more network addresses provided in the DNS reply for the alias.

5. The article of manufacture of claim 4 wherein the non-transitory storage medium further comprises instructions stored thereon that are executable by said computing device to:
send, by said computing device, the list of network addresses, having the load balancing algorithm applied thereto, to a client program.

6. The article of manufacture of claim 4 wherein the instructions to apply the load balancing algorithm to the list of network addresses comprise instructions executable by said computing device to:
arrange, by said computing device, the network addresses as an ordered list based on a set of performance metrics.

7. An apparatus to provide load balancing, the apparatus comprising:
a network device to load balance configurable as a proxy to an authoritative domain name system (DNS) server and including:
a non-transitory storage medium having instructions stored thereon;
a parser to receive a DNS reply and to detect the CNAME record in said DNS reply, wherein said DNS reply was generated by the authoritative DNS server in response to a DNS query to resolve an alias into network addresses, the alias associated with a canonical name (CNAME) record, wherein the alias is for a primary domain; and
a controller coupled to the parser, the controller being operative to apply a load balancing algorithm for the primary domain, to a list of one or more network addresses provided in the DNS reply to the DNS query to resolve the alias into network addresses.

8. The apparatus of claim 7 wherein said network device to load balance further comprises a proxy module to receive the DNS reply, wherein the DNS reply to the DNS query is received from the authoritative DNS server.

9. The apparatus of claim 7 wherein the load balancing algorithm comprises an arrangement of the network addresses provided in the received DNS reply as an ordered list based on a set of performance metrics.

10. The method of claim 1 wherein the DNS reply is received by said processor from an authoritative DNS server in response to a DNS query to resolve a name into a network address.

11. The article of manufacture of claim 4 wherein the DNS reply is received by said computing device from an authoritative DNS server as a reply to a DNS query to resolve a name into a network address.

12. An apparatus to provide load balancing, the apparatus comprising:
a network device to load balance configured to:
receive a domain name system (DNS) reply for an alias associated with a canonical name (CNAME) record, wherein the alias is for a primary domain;
detect the CNAME record in the received DNS reply; and
apply a load balancing algorithm for the primary domain, to a list of one or more network addresses provided in the DNS reply for the alias.

13. The apparatus of claim 12 wherein said network device to load balance comprises a controller to perform said apply.

14. The apparatus of claim 12 wherein the DNS reply is received by said network device to load balance from an authoritative DNS server as a reply to a DNS query to resolve a name into a network address.

15. The apparatus of claim 12 wherein the list of network addresses provided in the DNS reply comprises virtual IP addresses.

16. The apparatus of claim 12 wherein said load balancing algorithm comprises at least one performance metric to be applied by said network device to load balance to at least one network address in said list.

17. The apparatus of claim 12 wherein said network device to load balance is configured as a site switch to balance load amongst host servers.

18. The method of claim 1 wherein the alias and the primary domain comprises a common domain.

* * * * *